(12) United States Patent
Hall et al.

(10) Patent No.: US 7,372,859 B2
(45) Date of Patent: May 13, 2008

(54) SELF-CHECKING PAIR ON A BRAIDED RING NETWORK

(75) Inventors: Brendan Hall, Eden Prairie, MN (US); Kevin R. Driscoll, Maple Grove, MN (US); Michael Paulitsch, Columbia Heights, MN (US)

(73) Assignee: Honeywell International Inc., Morristown, NJ (US)

( * ) Notice: Subject to any disclaimer, the term of this patent is extended or adjusted under 35 U.S.C. 154(b) by 619 days.

(21) Appl. No.: 11/010,249

(22) Filed: Dec. 10, 2004

(65) Prior Publication Data

US 2005/0152379 A1    Jul. 14, 2005

Related U.S. Application Data

(63) Continuation-in-part of application No. 10/993,931, filed on Nov. 19, 2004, and a continuation-in-part of application No. 10/994,209, filed on Nov. 19, 2004, and a continuation-in-part of application No. 10/993,936, filed on Nov. 19, 2004, and a continuation-in-part of application No. 10/993,933, filed on Nov. 19, 2004, and a continuation-in-part of application No. 10/993,932, filed on Nov. 19, 2004, and a continuation-in-part of application No. 10/993,162, filed on Nov. 19, 2004.

(60) Provisional application No. 60/523,892, filed on Nov. 19, 2003, provisional application No. 60/523,865, filed on Nov. 19, 2003.

(51) Int. Cl.
*H04L 12/28* (2006.01)
*H04Q 7/20* (2006.01)
*G06F 15/16* (2006.01)

(52) U.S. Cl. ............. 370/400; 370/258; 370/407; 370/447; 455/453; 709/225

(58) Field of Classification Search ............. 370/258, 370/270, 360, 400, 407, 425, 498, 447, 503; 455/422.1, 419, 453, 555; 375/211; 710/36, 710/100, 305; 709/240, 225
See application file for complete search history.

(56) References Cited

U.S. PATENT DOCUMENTS 4,417,334 A    11/1983    Gunderson et al.

(Continued)

FOREIGN PATENT DOCUMENTS

AT    407582 B    4/2001

(Continued)

OTHER PUBLICATIONS

Al-Rousan et al., "The Two-Processor Reliability of Hierarchical Larg-Scale Ring-Based Networks", "Proceedings of the 29th Hawaii International Conference on System Sciences", 1996, pp. 63-71.

(Continued)

*Primary Examiner*—Afsar Qureshi
(74) *Attorney, Agent, or Firm*—Fogg & Powers; Jon M. Powers

(57) ABSTRACT

In one embodiment, one or more self checking pairs are implemented at the application layer in a network that supports the qualified propagation of data at the transport layer (for example, in a network having a braided ring topology).

37 Claims, 14 Drawing Sheets

U.S. PATENT DOCUMENTS

| | | | |
|---|---|---|---|
| 4,428,046 | A | 1/1984 | Chari et al. |
| 4,630,254 | A | 12/1986 | Tseng |
| 4,631,718 | A | 12/1986 | Miyao |
| 4,740,958 | A | 4/1988 | Duxbury et al. |
| 4,856,023 | A | 8/1989 | Singh |
| 4,866,606 | A | 9/1989 | Kopetz |
| 5,161,153 | A | 11/1992 | Westmore |
| 5,257,266 | A | 10/1993 | Maki |
| 5,307,409 | A | 4/1994 | Driscoll |
| 5,341,232 | A | 8/1994 | Popp |
| 5,386,424 | A | 1/1995 | Driscoll et al. |
| 5,557,778 | A | 9/1996 | Vaillancourt |
| 5,896,508 | A | 4/1999 | Lee |
| 5,903,565 | A | 5/1999 | Neuhaus et al. |
| 6,052,753 | A | 4/2000 | Doerenberg et al. |
| 6,226,676 | B1 | 5/2001 | Crump et al. |
| 6,374,078 | B1 | 4/2002 | Williams et al. |
| 6,513,092 | B1 | 1/2003 | Gorshe |
| 6,594,802 | B1 | 7/2003 | Ricchetti et al. |
| 6,618,359 | B1 | 9/2003 | Chen et al. |
| 6,707,913 | B1 | 3/2004 | Harrison et al. |
| 6,760,768 | B2 | 7/2004 | Holden et al. |
| 6,842,617 | B2 | 1/2005 | Williams et al. |
| 6,925,497 | B1 | 8/2005 | Vetrivelkumaran et al. |
| 6,956,461 | B2 | 10/2005 | Yoon et al. |
| 7,050,395 | B1 | 5/2006 | Chow et al. |
| 7,085,560 | B2 | 8/2006 | Petermann |
| 7,088,921 | B1 | 8/2006 | Wood |
| 2002/0027877 | A1 | 3/2002 | Son et al. |
| 2002/0087763 | A1 | 7/2002 | Wendorff |
| 2005/0132105 | A1 | 6/2005 | Hall et al. |

FOREIGN PATENT DOCUMENTS

| | | |
|---|---|---|
| DE | 3238692 | 4/1984 |
| DE | 19633744 | 2/1998 |
| DE | 20220280 | 11/2003 |
| EP | 0405706 | 2/1990 |
| EP | 1280024 | 1/2003 |
| EP | 1280312 | 1/2003 |
| EP | 1365543 | 11/2003 |
| EP | 1398710 | 3/2004 |
| EP | 1469627 | 10/2004 |
| GB | 2028062 | 2/1980 |
| GB | 1581803 | 12/1980 |
| GB | 2175775 | 12/1986 |
| WO | 0064122 | 10/2000 |

OTHER PUBLICATIONS

"Backplane Data Bus ARINC Specification 659", Dec. 1993, pp. 1-132, Publisher: ARINC.

Bauer et al., "Assumption Coverage Under Different Failure Modes in the Time-Triggered Architecture", "8th IEEE International Conference on Emerging Technologies and Factory Automation", Oct. 2001, pp. 333-341, Publisher: IEEE.

Bauer et al., "Transparent Redundancy in the Time-Triggered Architecture", "Proceedings of the Conference on Dependable Systems and Networks", 2000, pp. 5-13, Publisher: IEEE.

Bauer et al., "The Central Guardian Approach to Enforce Fault Isolation in a Time-Triggered System", "Proceedings of Symposium on Autonomous Decentralized Systems", Apr. 2003, pp. 37-44, Publisher: IEEE.

Bosch, "Can Specification Version 2.0", "SAE Handbook—Parts and Components", 1998, pp. 1-72, vol. 2, Publisher: Society of Automotive Engineers.

D'Luna, "A Single-Chip Universal Cable Set-Top Box/Modern Transceiver", "Journal of Sold-State Circuits", Nov. 1998, pp. 1647-1660, vol. 34, No. 11, Publisher: IEEE.

Driscoll et al., "The Real Byzantine Generals", "Proceedings of Digital Avionics System Conference", Oct. 2004, pp. 6.D.4-1-6.D.4-11, Publisher: IEEE.

Brinkmeyer, "Flexray International Workshop Slides", "www.flexray-group.com", Apr. 2002, pp. 1-356, Publisher: Flexray.

"Flexray Communication System: Protocol Specification Version 2.1 Revision A", "www.flexray-group.com", Mar. 2006, pp. 1-8, Publisher: Flexray Consortium.

"Preliminary Node-Local Bus Guardian Specification Version 2.0.9", Dec. 2005, pp. 1-75, Publisher: Flexray Consortium.

"Preliminary Central Bus Guardian Specification Version 2.0.9", Dec. 2005, pp. 1-38, Publisher: Flexray Consortium.

Grnarov et al., "A Highly Reliable Distributed Loop Network Architecture", "Proceedings of Fault-Tolerant Computing Symposium", Jun. 1980, pp. 319-324, Publisher: IEEE.

Gruenbacher, "Fault Injection for TTA", 1999, Publisher: Information Society Technologies.

Hall et al., "Ringing Out Fault Tolerance a New Ring Network for Superior Low-Dost Dependability", "International Conference on Dependable Systems and Networks (DSN'05)", 2005, pp. 298-307.

Hammett et al., "Achieving 10-9 Dependability With Drive-By-Wire Systems", "SAE World Congress", 2003, pp. 534-547, vol. 112, No. 7, Publisher: Society of Automotive Engineers.

Hopper et al., "Design and Use of an Integrated Cambridge Ring", "Journal on Selected Areas in Communications", Nov. 2003, pp. 775-784, vol. 1, No. 5, Publisher: IEEE.

Hoyme et al., "SAFEbus", "Proceedings of the Digital Avionics Systems Conference", Oct. 1992, pp. 68-73, Publisher: IEEE.

Hoyme et al., "Safebus", "IEEE Aerospce and Electronics Systems Magazine", Mar. 1993, pp. 34-39, vol. 8, No. 3, Publisher: IEEE.

Huber et al., "SILK: An Implementation of a Buffer Insertion Ring", "Journal on Selected Areas in Communications", Nov. 1983, pp. 766-774, vol. 1, No. 5, Publisher: IEEE.

Hwang et al., "Survival Reliability of Some Double-Loop Networks and Chordal Rings", "Transactions on Computers", 1995, pp. 1468-1471, vol. 44, No. 12, Publisher: IEEE.

"Internet Content Adaptation", "Network Appliance", Jul. 2001, pp. 1-13.

IEEE Computer Society, "1149.6 IEEE Standard for Boundary-Scan Testing of Advanced Digital Networks", Apr. 17, 2003, pp. 1-139, Publisher: IEEE, Published in: New York, NY.

Johansson et al., "On Communication Requirements for Control-by-Wire Applications", "Proceedings of System Safety Conference", Aug. 2003, pp. 1123-1132.

Kanoun et al., "Dependability Evaluation of Bus and Ring Communication Topologies for the Delta-4 Distr Fault-Tolerant Architecture", "Proceedings of the Symposium on Reliable Distributed Systems", 1991, pp. 130-141, Publisher: IEEE.

Kieckhafer et al., "The Maft Architecture for Distributed Fault Tolerance", "Transactions on Computers", 1988, pp. 398-405, vol. 37, No. 4, Publisher: IEEE.

Kopetz et al., "TTP—A Protocol for Fault-Tolerant Real-Time Systems", "Computer", January 1194, pp. 14-23, vol. 27, No. 1, Publisher: IEEE Computer Society, Published in: Long Beach, CA.

Liu et al., "The Distributed Double-Loop Computer Network (DDLCN)", "ACM '80 Proceedings of the ACM 1980 Annual Conference", 1980, pp. 164-178, Publisher: ACM.

Lonn, "Initialsynchronization of TDMA Communication in Distributed Real-Time Systems", "Conference on Distributed Computing Systems", 1999, pp. 370-379, Publisher: IEEE.

Nayak et al., "Ring Reconfiguration in Presence of Close Fault Cuts", "Proceedings of Hawaii International Conference on System Science", 1996, pp. 422-428, Publisher: IEEE.

Paulitsch et al., "Cverage and the Use of Cyclic Redundancy Codes in Ultra-Dependable Systems", "2005 International Conference on Dependable Systems and Networks (DSN'05)", 2005, pp. 346-355.

Poledna et al., "Replica Determinism and Flexible Scheduling in Hard Real-Time Dependable Systms", "IEEE Transactions on Computers", Feb. 2000, pp. 100-111, vol. 49, No. 2, Publisher: IEEE.

Poledna, "Replica Determinism in Distributed Real-Time Systems: A Brief Survey", "Real-Time Systems", 1994, pp. 289-316, vol. 6.

"Software Considerations in Airborne Systems and Equipment Certification", "http://www.rtca.org", Dec. 1992, pp. 1-112, Publisher: RTCA.DO-178b.

Rushby, "Bus Architectures for Safety-Critical Embedded Systems, Embedded Software", "Proceedings of 1st International Workshop on Embedded Software, Notes in Computer Science", Oct. 2001, pp. 306-323, vol. 2211, Publisher: Springer-Verlag, Published in: Germany.

Saltzer et al., "Why a Ring", "Proceedings of Symposium on Data Communications", 1981, pp. 211-217, Publisher: IEEE.

Sivencrona et al., "Protocol Membership Agreement in Distributed Communicaiton System—A Question of Brittleness", "SAE World Congress, Paper No. 2003-01-0108", 2003, pp. 1-6, Publisher: Society of Automotive Engineers Inc.

Steiner et al., "The Startup Problem in Fault-Tolerant Time-Triggered Communication", "International Conference on Dependable Systems and Networks (DSN'06)", 2006, pp. 35-44.

Steiner et al., "The Transition From Asynchronous to Synchronous System Operation: An Approach From Distributed Fault-Tolerant Systems", "Proceedings of Conference on Distributed Computing Systems", Jul. 2002, pp. 329-336, Publisher: IEEE.

Sundaram et al., "Controller Integrity in Automotive Failsafe System Architectures", "2006 SAE World Congress", 2006, pp. 1-10, Publisher: SAE International.

Tomlinson et al., "Extensible Proxy Services Framework", Jul. 2000, pp. 1-13, Publisher: Internet Society.

"Time-Triggered Protocol TTP/C", Publisher: TTTECH Computertechnik GmbH, Published in: Austria.

Wensley et al., "The Design, Analysis, and Verification of the Sift Fault Tolerant System", "Proceedings of Conference on Software Engineering", 1976, pp. 458-469, Publisher: IEEE Computer Society Press.

Yeh, "Design Condiserations in Boeing 777 Fly-By-Wire Computers","High-Asssurance Systems Engineering Symposium", Nov. 1998, pp. 64-72, Publishers: IEEE.

Yeh, "Triple-Triple Redundant 777 Primary Flight Computer", "Proceedings of the Aerospace Applications Conference", 1996, pp. 293-307, vol. 1, Publisher: IEEE, Published in: New York, NY.

Avizienis,"A Fault Tolerance Infrastructure for Dependable Computing With High-Performance Cots Components", "Conference Proceedings on: Dependable Systems and Networks", Jun. 25, 2000, pp. 492-500, Publisher: IEEE, Published in: New York, NY.

SELF-CHECKING PAIR ON A BRAIDED RING NETWORK

CROSS REFERENCE TO RELATED APPLICATIONS

This application is a continuation-in-part of the following (all of which are hereby incorporated herein by reference):

U.S. patent application Ser. No. 10/993,931, filed Nov. 19, 2004, entitled "UNSYNCHRONOUS MODE BROTHER'S KEEPER BUS GUARDIAN FOR A RING NETWORKS" (which is also referred to here as the "10/993,931 Application"), which claims the benefit of U.S. Provisional Application No. 60/523,892, filed on Nov. 19, 2003, and U.S. Provisional Application No. 60/523,865, filed on Nov. 19, 2003 (both of which are incorporated herein by reference);

U.S. patent application Ser. No. 10/994,209, filed Nov. 19, 2004, entitled "CLIQUE AGGREGATION IN TDMA NETWORKS," which claims the benefit of U.S. Provisional Application No. 60/523,892, filed on Nov. 19, 2003, and U.S. Provisional Application No. 60/523,865, filed on Nov. 19, 2003;

U.S. patent application Ser. No. 10/993,936, filed Nov. 19, 2004, entitled "SYNCHRONOUS MODE BROTHER'S KEEPER BUS GUARDIAN FOR A TDMA BASED NETWORK," which claims the benefit of U.S. Provisional Application No. 60/523,892, filed on Nov. 19, 2003, and U.S. Provisional Application No. 60/523,865, filed on Nov. 19, 2003;

U.S. patent application Ser. No. 10/993,933, filed Nov. 19, 2004, entitled "HIGH INTEGRITY DATA PROPAGATION IN A BRAIDED RING," which claims the benefit of U.S. Provisional Application No. 60/523,892, filed on Nov. 19, 2003, and U.S. Provisional Application No. 60/523,865, filed on Nov. 19, 2003; and U.S. patent application Ser. No. 10/993,932, filed Nov. 19, 2004, entitled "DIRECTIONAL INTEGRITY ENFORCEMENT IN A BIDIRECTIONAL BRAIDED RING NETWORK," which claims the benefit of U.S. Provisional Application No. 60/523,892, filed on Nov. 19, 2003, and U.S. Provisional Application No. 60/523,865, filed on Nov. 19, 2003.

This application is related to U.S. patent application Ser. No. 10/993,162, filed Nov. 19, 2004, entitled "MESSAGE ERROR VERIFICATION USING CHECKING WITH HIDDEN DATA," which is also referred to here as the "10/993,162 Application" and is incorporated herein by reference.

TECHNICAL FIELD

The following description relates to communication systems in general and to distributed, fault-tolerant communication systems in particular.

BACKGROUND

Distributed, fault-tolerant communication systems are used, for example, in applications where a failure could possibly result in injury or death to one or more persons. Such applications are referred to here as "safety-critical applications." One example of a safety-critical application is in a system that is used to monitor and manage sensors and actuators included in an airplane or other aerospace vehicle.

One architecture that is commonly considered for use in such safety-critical applications is the Time-Triggered Architecture (TTA). In a TTA system, multiple nodes communicate with one another over two replicated high-speed communication channels using, for example, the Time Triggered Protocol/C (TTP/C) or the FLEXRAY protocol. In some embodiments, at least one of the nodes in such a TTA system is coupled to one or more sensors and/or actuators over two replicated, low-speed serial communication channels using, for example, the Time Triggered Protocol/A (TTP/A).

In one configuration of such a TTA system, various nodes communicate with one another over two, replicated communication channels, each of which is implemented using a star topology. In such a configuration, each channel includes an independent, centralized bus guardian. Each such centralized bus guardian represents a single point of failure for the respective channel. Another configuration of a TTA system is implemented using a linear bus topology in which various nodes communicate with one another over two, replicated communication channels and where each node includes a separate, independent bus guardian for each communication channel to which that node is coupled. In other words, where two communication channels are used, each node includes two independent bus guardians. Providing multiple independent bus guardians within each node, however, may not be suitable for some applications (for example, due to the increased cost associated with providing multiple bus guardians within each node).

SUMMARY

In one embodiment, a network comprises a plurality of nodes that are communicatively coupled to one another over first and second channels that form first and second rings, respectively. The network further comprises at least one self checking pair comprising at least two of the plurality of nodes. Each node is communicatively coupled via the first channel to a first neighbor node in a first direction and to a second neighbor node in a second direction. Each node is communicatively coupled via the second channel to the first neighbor node in the first direction and to the second neighbor node in the second direction. The two nodes of the self checking pair are neighbor nodes of one another. When each node relays a first relayed unit of data along the first channel in the first direction, that node relays information indicative of the integrity of the first relayed unit of data along with the first relayed unit of data. When each node relays a second relayed unit of data along the second channel in the second direction, that node relays information indicative of the integrity of the second relayed unit of data along with the second relayed unit of data. Each of the two nodes of the self checking pair, for a particular unit of data communicated on the first channel in the first direction and on the second channel in the second direction: sends, to the other of the two nodes included in the self checking pair, information about first and second instances of the particular unit of data received by that node from the first and second channels, respectively; receives, from the other of the two nodes included in the self checking pair, information about first and second instances of the particular unit of data received by that other node from the first and second channels, respectively; and selects, for use in processing performed by that node for the self checking pair, at least one of the first and second instances of the particular unit of data received by that node based on at least one of: information about the first and second instances received by that node from the first and second channels, respectively, and information about the first and second instances received by the other of the two nodes of the self checking pair from the first and second channels, respectively.

In another embodiment, a network comprises a plurality of nodes that are communicatively coupled to one another over first and second channels and at least one self checking pair comprising at least two of the plurality of nodes. Each node is communicatively coupled via the first channel to at least one first transmit-to node to which that node transmits data on the first channel and at least one first receive-from node from which that node receives data from the first channel. Each node is communicatively coupled via the second channel to at least one second transmit-to node to which that node transmits data on the second channel and at least one second receive-from node from which that node receives data from the second channel. A first of the two nodes of the self checking pair comprises the respective first receive-from node and the respective second transmit-to node for a second of the two nodes of the self checking pair. The second of the two nodes of the self checking pair comprises the respective second receive-from node and the respective first transmit-to node for the first of the two nodes of the self checking pair. When each node relays a first relayed unit of data along the first channel, that node relays information indicative of the integrity of the first relayed unit of data along with the first relayed unit of data. When each node relays a second relayed unit of data along the second channel, that node relays information indicative of the integrity of the second relayed unit of data along with the second relayed unit of data. Each of the two nodes of the self checking pair, for a particular unit of data communicated on the first channel and on the second channel sends, to the other of the two nodes included in the self checking pair, information about first and second instances of the particular unit of data received by that node from the first and second channels, respectively; receives, from the other of the two nodes included in the self checking pair, information about first and second instances of the particular unit of data received by that other node from the first and second channels, respectively; and selects, for use in processing performed by that node for the self checking pair, at least one of the first and second instances of the particular unit of data received by that node based on at least one of: information about the first and second instances received by that node from the first and second channels, respectively; and information about the first and second instances received by the other of the two nodes of the self checking pair from the first and second channels, respectively.

Another embodiment comprises a method for use in a network comprising a plurality of nodes that are communicatively coupled to one another over first and second channels that form first and second rings, respectively. Each node is communicatively coupled via the first channel to a first neighbor node in a first direction and to a second neighbor node in a second direction. Each node is communicatively coupled via the second channel to the first neighbor node in the first direction and to the second neighbor node in the second direction. The network comprises at least one self-checking pair that includes two nodes that are neighbor nodes of one another. The method comprises relaying, by each of the plurality of nodes, along the first channel, a first unit of data received by the respective node on the first channel along with information indicative of the integrity of the first relayed unit of data. The method further comprises relaying, by each of the plurality of nodes, along the second channel, a second unit of data received by the respective node on the second channel along with information indicative of the integrity of the second relayed unit of data. The method further comprises, for a particular unit of data communicated on the first and second channels, at each of the two nodes of the self checking pair: sending, to the other of the two nodes included in the self checking pair, information about first and second instances of the particular unit of data received by that node from the first and second channels, respectively; receiving, from the other of the two nodes included in the self checking pair, information about first and second instances of the particular unit of data received by that other node from the first and second channels, respectively; and selecting, for use in processing performed by that node for the self checking pair, at least one of the first and second instances of the particular unit of data received by that node based on at least one of: information about the first and second instances received by that node from the first and second channels, respectively; and information about the first and second instances received by the other of the two nodes of the self checking pair from the first and second channels, respectively.

In another embodiment, a self checking pair comprises first and second nodes. Each of the first and second nodes comprises an interface to communicatively couple the respective node to at least first and second channels. The first and the second channels comprise first and second rings respectively. The first and second nodes are neighbor nodes of one another. For each unit of data relayed on the first and second channels, information indicative of the integrity of the relayed unit of data is relayed along with the relayed unit of data. For a particular unit of data communicated on the network: each of the first and second nodes exchange information about a first instance of the particular unit of data received from the first channel and about a second instance of the particular unit of data received from the second channel; and each of the first and second nodes of the self checking pair selects, for use in processing performed by the respective node, at least one of the first and second instances of the particular unit of data received by the respective node based on at least one of: information about the first and second instances received by that node from the first and second channels, respectively; and information about the first and second instances received by the other of the two nodes of the self checking pair from the first and second channels, respectively.

The details of one or more embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Figure 1:
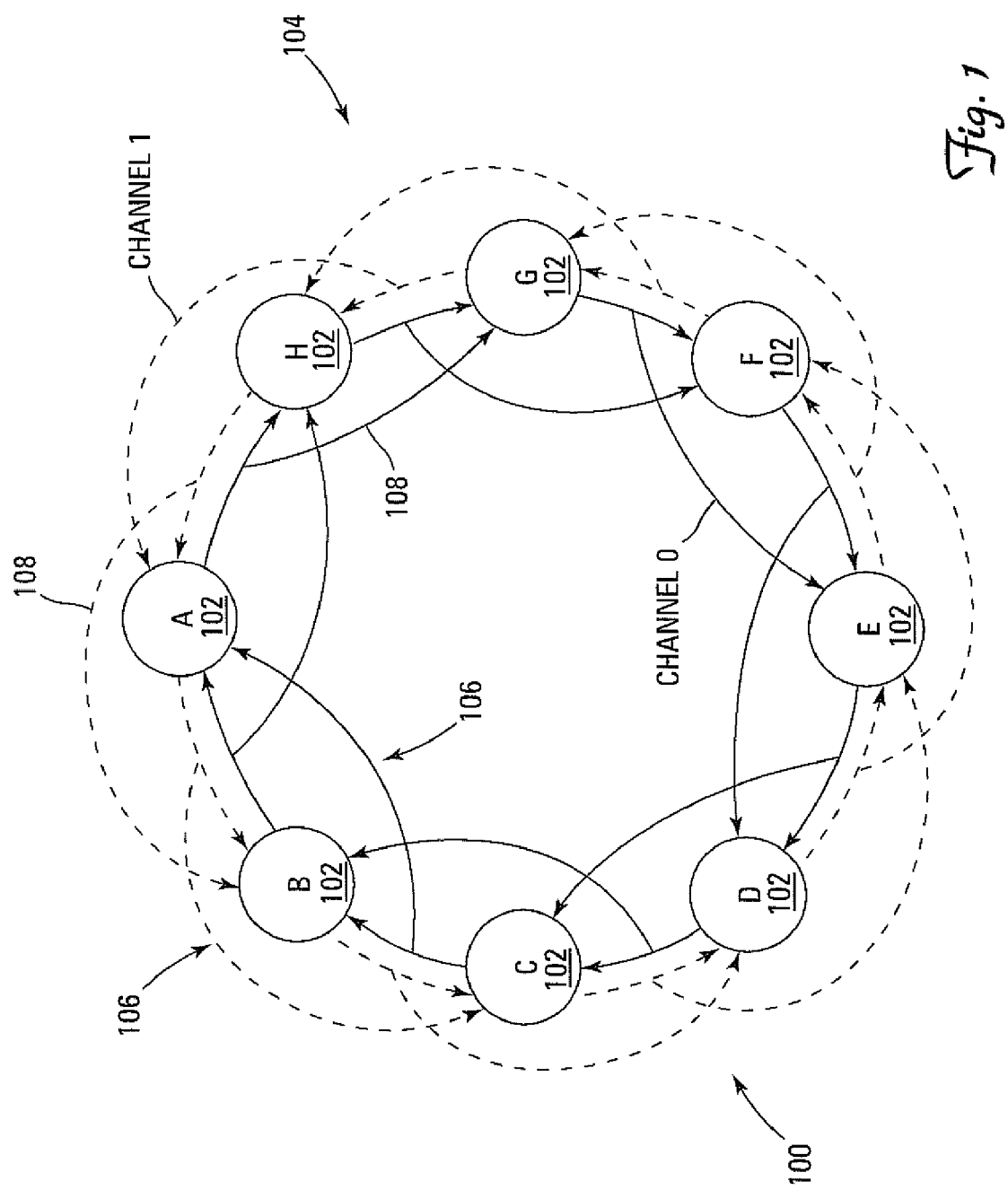
FIG. 1 is a block diagram of one embodiment of a communication network.

FIG. 1 is a block diagram of one embodiment of a communication network 100. Communication network 100 includes multiple nodes 102. Each node 102 of the network 100 is communicatively coupled to at least one channel 106. For a given direction in which data flows in the channel 106, the channel 106 directly (that is, with only one hop) communicatively couples each node 102 to at least two other nodes 102 from which that node 102 receives data (also referred to here as "receive-from nodes") and to at least two other nodes 102 to which that node 102 transmits data (also referred to here as the "transmit-to nodes"). In one embodiment, one of the received-from nodes 102 is designated as a "primary" receive-from node 102 and the other receive-from nodes 102 are designated as "secondary" receive-from nodes 102. When a node 102 "relays" data on a channel 106 in a given direction, that node 102 receives data from the primary receive-from node 102 for that channel 106 and that direction and forwards the received data along the same channel to each of the transmit-to nodes designated for that node 102 for that channel 106 and that direction. Data received by a node from the secondary receive-from nodes 102 is used for the various comparison operations described below and/or is relayed in the event that suitable data is not received from the primary receive-from node. When a given node 102 "transmits" data (that is, when the given node 102 is the source of data communicated on the network 100) along a channel 106 in a given direction, that node 102 transmits the data to each of the transmit-to nodes 102 designated for that node 102 for that channel 102 and direction.

In the particular embodiment shown in FIG. 1, the nodes 102 are arranged in a ring 104 having a "braided ring" topology in which the nodes 102 communicate with one another over multiple communication channels 106. In the particular embodiment shown in FIG. 1, eight nodes 102 communicate with one another over two replicated communication channels 106. In other embodiments, a different number and/or type of nodes 102 and/or channels 106 and/or different network topologies are used.

Embodiments of network 100 are implemented using various media access schemes. For example, the embodiment shown in FIG. 1 is described here as being implemented using a time division multiple access (TDMA) media access scheme (for example, the media access scheme implemented in the TTP/C or FLEXRAY protocols). In other embodiments, other media access schemes are used.

The eight nodes 102 shown in FIG. 1 are also individually labeled in FIG. 1 with the letters A through H and are referred to here individually as "node A," "node B," and so forth. As used herein, a "neighbor node" (or just "neighbor") is a node that is immediately next to a given node 102 in the ring 104. Each node 102 has two "neighbor nodes 102, one in the clockwise direction (also referred to here as the "clockwise neighbor node" or "clockwise neighbor") and one in the counter-clockwise direction (also referred to here as the "counter-clockwise neighbor node" or "counter-clockwise neighbor"). For example, the neighbor nodes 102 for node A are node H in the clockwise direction and node B in the counter-clockwise direction.

In addition, as used herein, a "neighbor's neighbor node" (or just "neighbor's neighbor") for a given node 102 is the neighbor node 102 of the neighbor node 102 of the given node 102. Each node 102 has two neighbor's neighbor nodes 102, one in the clockwise direction (also referred to here as the "clockwise neighbor's neighbor node" or "clockwise neighbor's neighbor") and one in the counter-clockwise direction (also referred to here as the "counter-clockwise neighbor's neighbor node" or "counter-clockwise neighbor's neighbor"). For example, the two neighbor's neighbor nodes for node A are node G in the clockwise direction and node C in the counter-clockwise direction.

The two communication channels 106 are individually labeled in FIG. 1 (and are also referred to here) as "channel 0" and "channel 1" respectively. In the embodiment shown in FIG. 1, each of the channels 106 is formed using multiple point-to-point, unidirectional serial links 108. Channel 0 interconnects the node 102 in the clockwise direction around the ring 104 and channel 1 interconnects the nodes 102 in the counter-clockwise direction around the ring 104. In other embodiments, other types of links are used. For example, in one such other embodiment, bidirectional links are used and the devices, systems, and techniques described here are performed for each direction in which communications occur.

As used here, when a link 108 is described as being connected "from" a first node 102 "to" a second node 102, the link 108 provides a communication path for the first node 102 to send data to the second node 102 over the link 108. That is, the direction of that unidirectional link 108 is from the first node 102 to the second node 102.

A link 108 is connected from each node 102 to that node's clockwise neighbor node 102. A link 108 is also connected from each node 102 to that node's clockwise neighbor's neighbor node 102. For example, a link 108 is connected from node A to node H and a link 108 is connected from node A to node G. These clockwise links 108 make up channel 0 and are shown in FIG. 1 using solid lines.

A link 108 is connected from each node 102 to that node's counter-clockwise neighbor node 102. A link 108 is also connected from each node 102 to that node's counter-clockwise neighbor's neighbor node 102. For example, a link 108 is connected from node A to node B and a link 108 is connected from node A to node C. These counter-clockwise links 108 make up channel 1 and are shown in FIG. 1 using dashed lines.

The links 108 that connect a given node 102 to that node's respective clockwise and counter-clockwise neighbor nodes are also referred to here as "direct" links 108. The links 108 that connect a given node 102 to that node's respective clockwise and counter-clockwise neighbor's neighbors are referred to here as "skip" links 108.

In the particular embodiment shown in FIG. 1, for channel 0, the receive-from nodes for each node 102 are that node's counter-clockwise neighbor and counter-clockwise neighbor's neighbor and the transmit-to nodes for each node 102 are that node's clockwise neighbor and clockwise neighbor's neighbor. In the embodiments described herein, the primary receive-from node is each node's counter-clockwise neighbor (though in other embodiments, the primary receive-from node is the node's counter-clockwise neighbor's neighbor). In the particular embodiment shown in FIG. 1, for channel 1, the receive-from nodes for each node 102 are that node's clockwise neighbor and clockwise neighbor's neighbor and the transmit-to nodes for each node 102 are that node's counter-clockwise neighbor and counter-clockwise neighbor's neighbor. In the embodiments described herein, the primary receive-from node is each node's clockwise neighbor (though in other embodiments, the primary receive-from node is the node's clockwise neighbor's neighbor).

In the particular embodiment shown in FIG. 1, the network 100 is implemented as a peer-to-peer network in which each transmission is intended to be received by each node 102 of the network 100. In other embodiments, each transmission is intended for a particular destination node. Moreover, in the embodiments described here, data are communicated in the network 100 in the form of frames of data though it is to be understood that, in other embodiments, other units of data are communicated over the network 100.

FIGS. 2 through 6 describe various embodiments of transport-layer processing performed in the embodiment of network 100 shown in FIG. 1. FIGS. 7-10 describe various embodiments of high-level processing (relative to the transport layer) performed in the embodiment of network 100 shown in FIG. 1 that is implemented on top of at least some of such transport-layer processing.

In the embodiments described here, the transport-layer processing comprises two at least two modes—an unsynchronized mode and a synchronized mode. When operating in a synchronized mode, the nodes 102 of network 100 are synchronized to a global time base and transmit in accordance with a TDMA media access scheme. With such a TDMA media access scheme, a schedule is used to determine when the nodes 102 in the network 100 transmit during a given schedule period or round. During a given schedule period, various nodes 102 in the network 100 are assigned a respective time slot in which to transmit. In other words, for any given time slot, the node 102 assigned to that time slot is allowed to transmit during that time slot (also referred to here as the "scheduled node" 102). In this embodiment, the scheduled node performs the processing described below in connection with FIG. 2. The other nodes 102 in the network 100 perform at least some of the relay processing described below in connection with FIGS. 3A-3B and 4A-4B.

When the nodes 102 are operating in an unsynchronized mode, the nodes 102 have not yet synchronized to a global time base and are not yet transmitting in accordance with a TDMA schedule. At least a portion of the processing performed, in one embodiment, by the nodes 102 of the network 100 while operating in an unsynchronized mode is described, for example, in the 10/993,931 Application.

Figure 2:
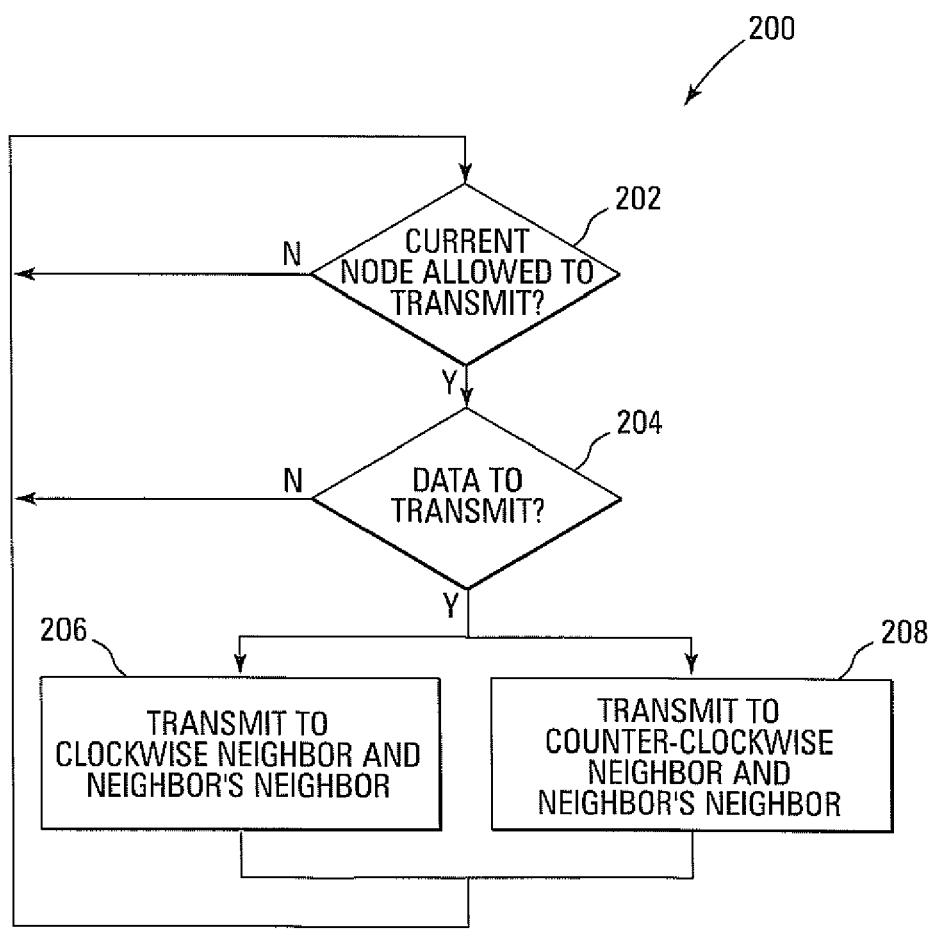
FIG. 2 is flow diagram of one embodiment of a method of transmitting data in the network of FIG. 1.

FIG. 2 is flow diagram of one embodiment of a method 200 of transmitting data in the network 100 of FIG. 1. The embodiment of method 200 shown in FIG. 2 is described here as being implemented in the embodiment described here in connection with FIGS. 1-5. Method 200 is performed by a node 102 that is operating in a synchronized mode in accordance with a TDMA schedule. Each node 102, in such an embodiment, performs the processing of method 200 when that node 102 is the scheduled node 102 (that is, when the current time slot is assigned to that node 102 by the TDMA schedule). In the context of FIG. 2, the node 102 that is performing the processing of method 200 is referred to here as the "current" node 102. In one embodiment, at least a portion of the functionality described here as being performed by the current node 102 is implemented in a controller included in the node 102. Other embodiments of method 200 are implemented in other ways.

The current node 102 performs the processing of method 200 when the current node 102 determines that the current node 102, in accordance with the TDMA schedule, is allowed to transmit on the network 100 (block 202). Each node 102 in the network 100 maintains information necessary to make such a determination. In the embodiment of FIGS. 1-5, such information includes information related to the TDMA schedule and the global time base to which the nodes 102 are synchronized.

When the current node 102 is allowed to transmit and the node 102 has data to transmit (checked in block 204), the current node 102 transmits a frame of data, along channel 0, to the current node's clockwise neighbor and clockwise neighbor's neighbor (block 206) and, along channel 1, to the current node's counter-clockwise neighbor and counter-clockwise neighbor's neighbor (block 208). The current node 102 transmits the frame to the current node's clockwise and counter-clockwise neighbors using the respective direct links 108. The current node 102 transmits the frame to the current node's clockwise and counter-clockwise neighbor's neighbors using the respective skip links 108. In one implementation of such an embodiment, the current node 102 includes a first transceiver that transmits the frame on channel 0 to the current node's clockwise neighbor and clockwise neighbor's neighbor and a second transceiver that transmits the frame on channel 1 to the current node's counter-clockwise neighbor and counter-clockwise neighbor's neighbor.

Figure 3A:
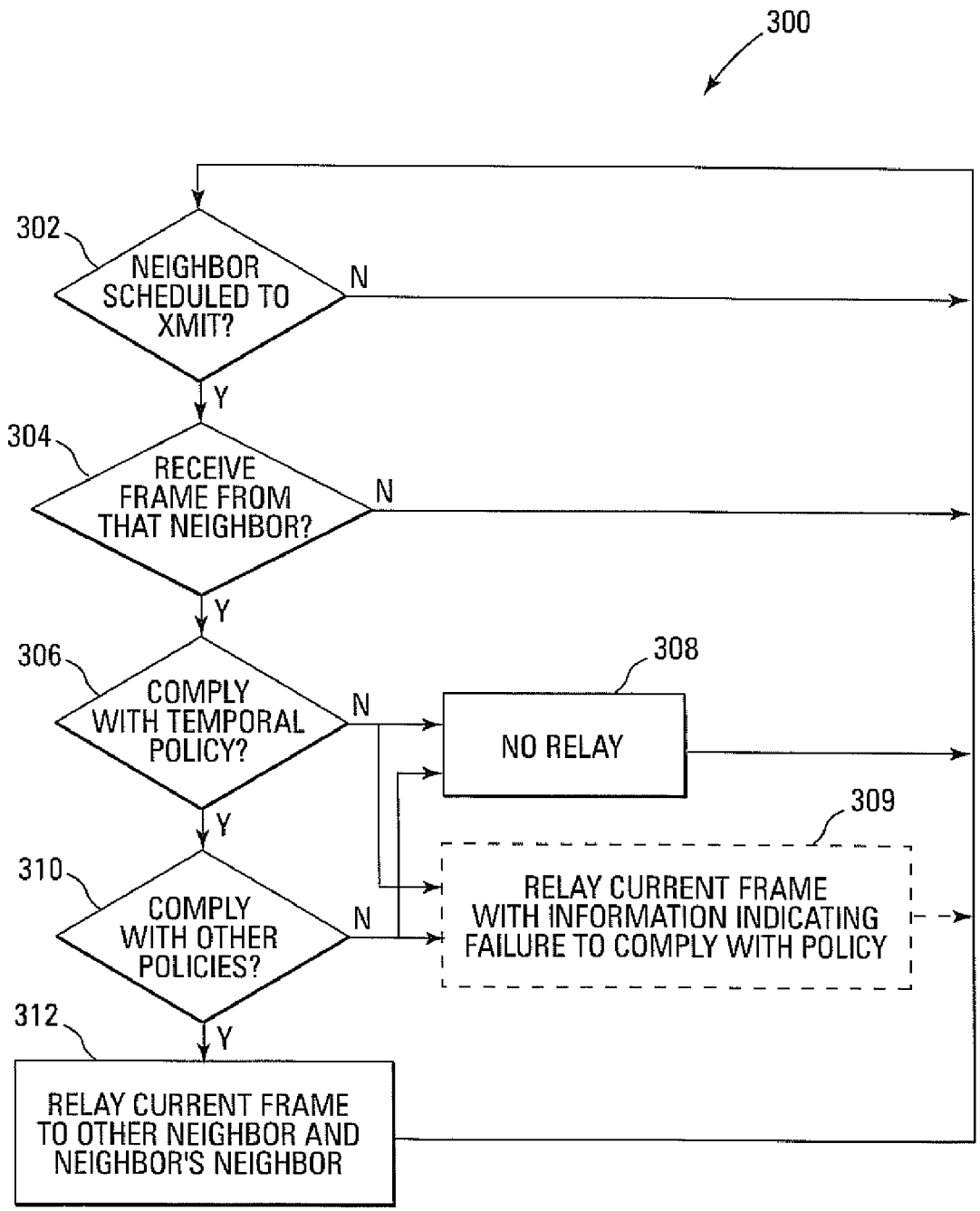
FIG. 3A is flow diagram of an embodiment of a method of relaying data in the network of FIG. 1.

FIG. 3A is flow diagram of one embodiment of a method 300 of relaying data in the network 100 of FIG. 1. When a node "relays" data, the node 102 receives data from one or more receive-from nodes and forwards the received data onto the one or more transmit-to nodes. That is, when a node 102 is relaying data, the node 102 is not the source of the data that the node 102 is forwarding onto other nodes. The embodiment of method 300 shown in FIG. 3A is described here as being implemented in the braided-ring embodiment described here in connection with FIGS. 1-5. In other embodiments, method 300 is implemented using other network topologies. One example of an alternative network topology in which method 300 can be implemented is a network topology that comprises two "simplex" ring channels. In one implementation of such a simplex ring network, the network uses a topology similar to the one shown in FIG. 1 except that there are no skip links that communicatively couple each node to its clockwise and counter-clockwise neighbor's neighbors.

Method 300 is performed by a node 102 that is operating in a synchronized mode in accordance with a TDMA schedule. Each node 102, in such an embodiment, performs the processing of method 300 when one of that node's neighbors is the scheduled node 102 for the current time slot. In the context of FIG. 3A, the node 102 performing the processing of method 300 is referred to here as the "current" node 102.

In one embodiment, at least a portion of the functionality described here as being performed by the current node 102 is implemented in a controller included in the node 102. Other embodiments of method 300 are implemented in other ways.

The current node 102 performs the processing of method 300 when the current node 102 determines that one of the neighbors of the current node 102 is scheduled to transmit during the current time slot (checked in block 302). Such a neighbor is also referred to here in the context of FIG. 3A as the "scheduled neighbor." In the embodiment of FIGS. 1-5, the current node 102 makes this determination based on information including the TDMA schedule and the global time base to which the nodes 102 are synchronized.

When the current node 102 determines that one of its neighbors is the scheduled node for the current time slot, the current node 102 only relays frames sourced from the scheduled neighbor that are received by the current node 102 from the scheduled neighbor via the direct link 108 that couples the scheduled neighbor to the current node 102. That is, if the current node 102 receives a frame that is sourced from a node 102 other than the scheduled neighbor, the current node 102 does not relay that frame.

When the current node 102 start receiving a frame from the scheduled neighbor (checked in block 304), the current node 102 checks if the transmission complies with one or more policies that are implemented in the network 100. In the particular embodiment shown in FIG. 3A, the current node 102 checks if the transmission complies with a temporal policy that specifies, for example, a particular window in which a transmission must start (checked in block 306). In one implementation of such an embodiment where the TTP/C or FLEXRAY protocol is supported, the current node 102 checks if the transmission complies with the temporal transmission requirements of the supported protocol. In the embodiment shown in FIG. 3A, if the transmission fails to comply with the temporal policy (for example, where a slightly-off-specification (SOS) fault occurs), the current node 102 does not relay the current frame (block 308). In an alternative embodiment (illustrated using dotted lines in FIG. 3A), if the transmission fails to comply with the temporal policy, the current node 102 relays the current frame along with the information (for example, an appended or shared integrity field) indicating that the transmission has failed to comply with the temporal policy (block 309). In another embodiment (not shown), if the transmission fails to comply with a first aspect of the temporal policy, the current node 102 does not relay the transmission and if the transmission fails to comply with a different aspect of the temporal policy (while complying with the first aspect), the current node 102 relays the current frame along with information indicating that the transmission has failed to comply with that aspect of the policy.

If the transmission complies with the temporal policy, the current node 102 checks if the transmission complies with one or more other policies (block 310). For example, in one embodiment, the current node 102 checks if the transmission complies with one or more semantic policies (for example, policies implementing semantic protocol state filtering). In another embodiment, where each frame includes a cyclic redundancy check (CRC) field that is calculated based on the contents of the frame, the current node 102 checks the CRC field to determine if any errors have been introduced into the frame in the course of transmitting the frame from the scheduled node to the current node 102. Another example of such a policy is an encoding layer enforcement policy. In another example, a frame-length policy is used and the current node 102 checks the length of the current frame (in such an example, failures to comply with the frame-length policy would, for example, be processed as described in connection with block 309 of FIG. 3A).

If the transmission fails to comply with one or more of the other policies, the current node 102 does not relay the transmission (block 308). In an alternative embodiment (shown in FIG. 3A using dashed lines), the current node 102 relays the current frame along with the information (for example, an appended or shared integrity field) indicating that the transmission has failed to comply with one or more policies (block 309). In another embodiment (not shown), if the transmission fails to comply with a first policy, the current node 102 does not relay the transmission and if the transmission fails to comply with a different policy (while complying with the first policy), the current node 102 relays the current frame along with information indicating that the transmission has failed to comply with the latter policy.

Otherwise, if the transmission complies with all the policies, the current node 102 relays the current frame to the current node's next neighbor and next neighbor's neighbor along the channel from which the current frame is being received (block 312). For example, where the scheduled node is node A and the current node is node B, the current node relays the current frame to node C (node B's next neighbor along channel 1) and to node D (node B's next neighbor's neighbor along channel 1).

In other embodiments, the current node 102 checks if the transmission complies with other policies instead of or in addition to the ones described above. For example, in one such other embodiment, the current node 102 checks the directional integrity of the transmission by the scheduled node (for example, in the manner described below in connection with FIG. 12) and appends to the frame a field indicating whether the frame was transmitted with directional integrity.

Figure 3B:
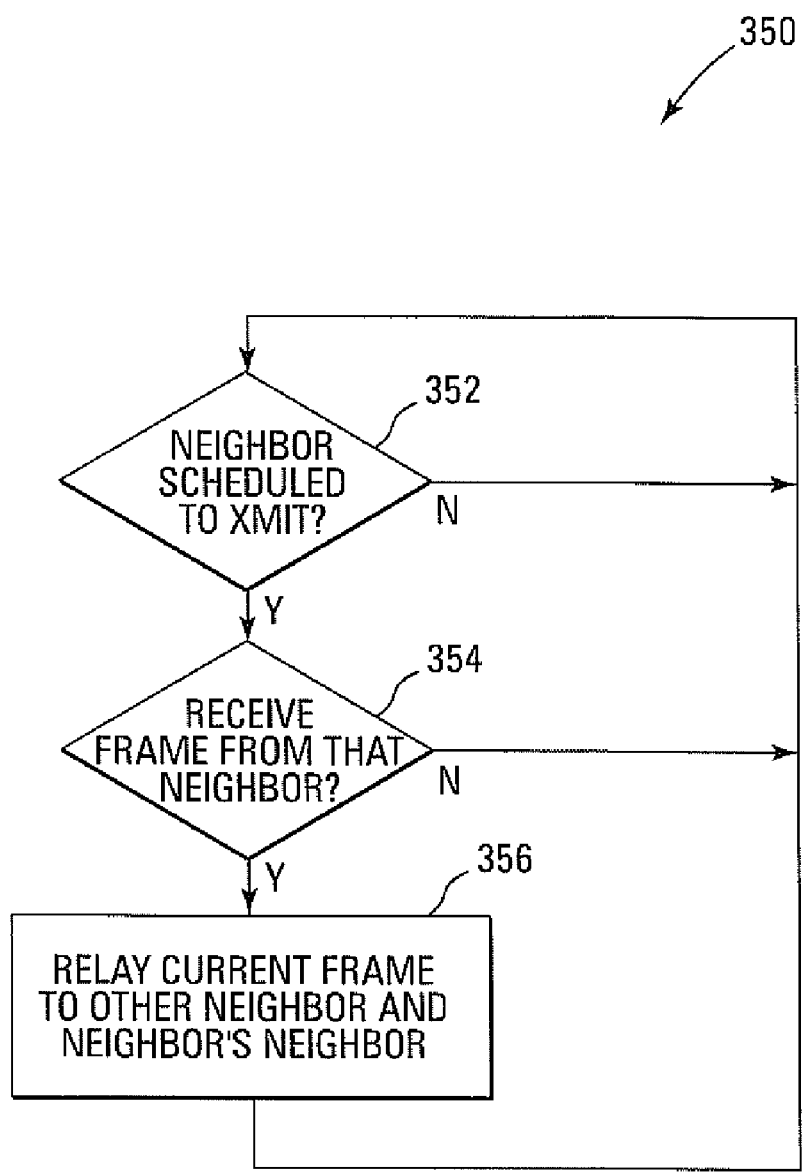
FIG. 3B is flow diagram of an embodiment of a method of relaying data in the network of FIG. 1.

FIG. 3B is flow diagram of another embodiment of a method 350 of relaying data in the network 100 of FIG. 1. The embodiment of method 350 shown in FIG. 3B is described here as being implemented in the braided-ring embodiment described here in connection with FIGS. 1-5. In other embodiments, method 350 is implemented using other network topologies. One example of an alternative network topology in which method 350 can be implemented is a network topology that comprises two "simplex" ring channels. In one implementation of such a simplex ring network, the network uses a topology similar to the one shown in FIG. 1 except that there are no skip links that communicatively couple each node to its clockwise and counter-clockwise neighbor's neighbors.

Method 350 is performed by a node 102 that is operating in a synchronized mode in accordance with a TDMA schedule. Each node 102, in such an embodiment, performs the processing of method 350 when one of that node's neighbors is the scheduled node 102 for the current time slot. In the context of FIG. 3B, the node 102 performing the processing of method 350 is referred to here as the "current" node 102. In one embodiment, at least a portion of the functionality described here as being performed by the current node 102 is implemented in a controller included in the node 102. Other embodiments of method 350 are implemented in other ways.

The current node 102 performs the processing of method 350 when the current node 102 determines that one of the neighbors of the current node 102 is scheduled to transmit during the current time slot (checked in block 352). Such a neighbor is also referred to here in the context of FIG. 3B as the "scheduled neighbor." In the embodiment of FIGS. 1-5, the current node 102 makes this determination based on information including the TDMA schedule and the global time base to which the nodes 102 are synchronized.

In method 350 (as in method 300 of FIG. 3A), when the current node 102 determines that one of its neighbors is the scheduled node for the current time slot, the current node 102 only relays frames sourced from the scheduled neighbor that are received by the current node 102 from the scheduled neighbor via the direct link 108 that couples the scheduled neighbor to the current node 102. That is, if the current node 102 receives a frame that is sourced from a node 102 other than the scheduled neighbor, the current node 102 does not relay that frame. However, unlink in method 300 of FIG. 3A, in method 350 of FIG. 3B, the current node 102 does not perform the "bus guardian" processing associated with blocks 308-310.

When the current node 102 start receiving a frame from the scheduled neighbor (checked in block 354), the current node 102 relays the received frame to the current node's next neighbor and next neighbor's neighbor along the channel from which that frame is being received (block 356). For example, where the scheduled node is node A and the current node is node B, the current node relays the frame received from node A to node C (node B's next neighbor along channel 1) and to node D (node B's next neighbor's neighbor along channel 1).

Figure 4A:
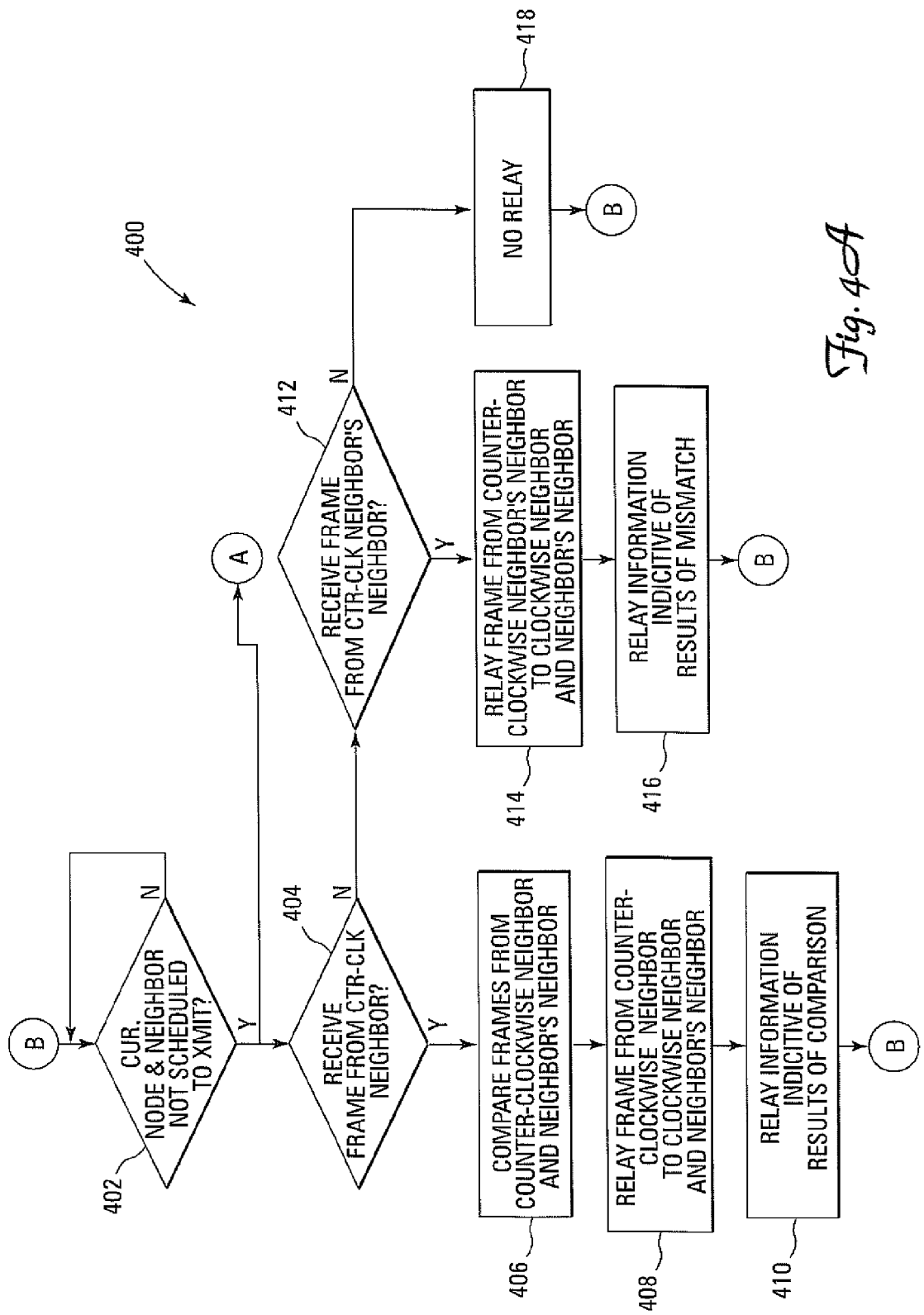
FIGS. 4A-4B are flow diagrams of an embodiment of a method of relaying data in the network of FIG. 1.
Figure 4B:
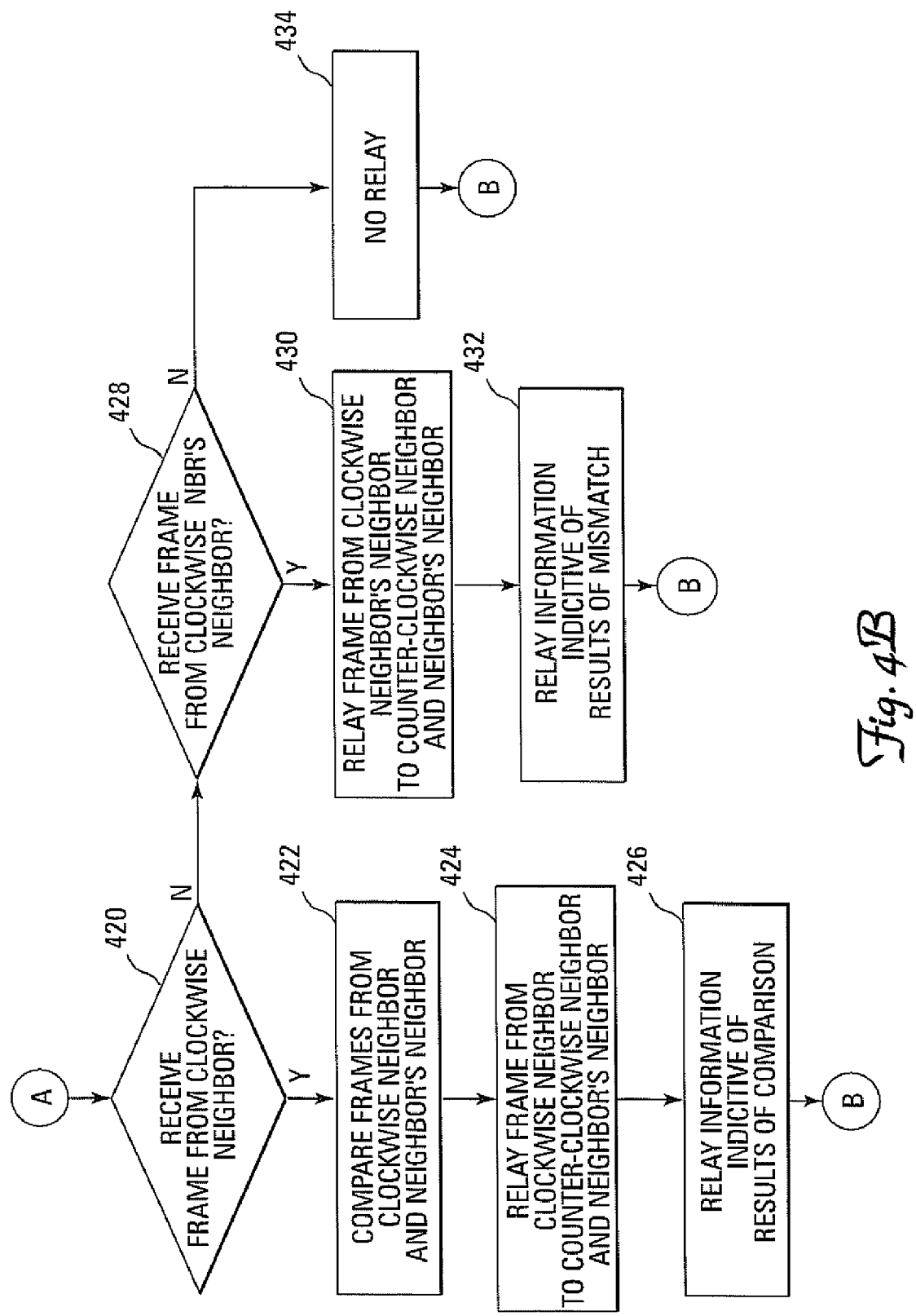

FIGS. 4A-4B are flow diagrams of one embodiment of a method 400 of relaying data in the network 100 of FIG. 1. The embodiment of method 400 shown in FIGS. 4A-4B is described here as being implemented in the embodiment described here in connection with FIGS. 1-5. Method 400 is performed by a node 102 that is operating in a synchronized mode in accordance with a TDMA schedule. Each node 102, in such an embodiment, performs the processing of method 400 when that node 102 is not scheduled to transmit during the current time slot and neither of that node's neighbors are scheduled to transmit during the current time slot. In the context of FIGS. 4A-4B, the node 102 performing the processing of method 400 is referred to here as the "current" node 102. In one embodiment, at least a portion of the functionality described here as being performed by the current node 102 is implemented in a controller included in the node 102. Other embodiments of method 400 are implemented in other ways.

The current node 102 performs the processing of method 400 when the current node 102 is not scheduled to transmit during the current time slot and neither of the current node's neighbors are scheduled to transmit during the current time slot (checked in block 402 of FIG. 4A). In the embodiment of FIGS. 1-5, the current node 102 makes this determination based on information including the TDMA schedule and the global time base to which the nodes 102 are synchronized.

When the current node 102 determines that the current node 102 is not scheduled to transmit during the current time slot and neither of the current node's neighbors are scheduled to transmit during the current time slot and the current node 102 starts to receive a frame from the current node's counter-clockwise neighbor on channel 0 (checked in block 404), the current node 102 compares the frame being received from the current node's counter-clockwise neighbor on channel 0 to any frame that is being received from the current node's counter-clockwise neighbor's neighbor on channel 0 (block 406). In the embodiment shown in FIG. 4, a bit-by-bit comparison is performed. Moreover, as described below in connection FIG. 5, because the frames will likely be received at the current node 102 at slightly different times, de-skew functionality is used to de-skew the received frames. The current node 102 relays the frame that is being received from the current node's counter-clockwise neighbor on channel 0 to the current node's clockwise neighbor and clockwise neighbor's neighbor along the channel 0 (block 408). After the current frame has been relayed and the comparison is complete, the current node 102 relays information indicative of the results of the comparison in or after the frame received from the current node's counter-clockwise neighbor (block 410). The current node 102 relays the information indicative of the results of the comparison to the current node's clockwise neighbor and clockwise neighbor's neighbor along the channel 0. In one embodiment, the information indicative of the results of the comparison comprises a one-bit, appended integrity field that the current node 102 appends to the frame received from the current node's counter-clockwise neighbor. In another embodiment, a shared integrity field is included at the end of each frame. In such an embodiment, the current node 102 sets the shared integrity field to a "negative" value (for example, a value of "0") if the comparison indicates that the two frames are not identical and, otherwise, does not alter the shared integrity field if the comparison indicates that the two frames are identical.

If the current node 102 does not receive a frame from the current node's counter-clockwise neighbor on channel 0 (for example, after a predetermined time-out period has elapsed) but starts to receive a frame from the current node's counter-clockwise neighbor's neighbor on channel 0 (checked in block 412), the current node 102 relays the frame that is being received from the current node's counter-clockwise neighbor's neighbor on to the current node's clockwise neighbor and clockwise neighbor's neighbor along the channel 0 (block 414). After that frame has been relayed, the current node 102 relays in or after that frame information indicating that there was a "mismatch" at the current node 102 for channel 0 (block 416). The current node 102 relays this information to the current node's clockwise neighbor and clockwise neighbor's neighbor along the channel 0. Because no frame was received from the counter-clockwise neighbor of the current node 102, it is not the case that a frame received from the counter-clockwise neighbor is identical to the frame received from the counter-clockwise neighbor's neighbor of the current node 102.

If the current node 102 does not receive a frame from the current node's counter-clockwise neighbor on channel 0 or from the current node's counter-clockwise neighbor's neighbor on channel 0, the current node 102 does not relay any data along channel 0 for the current time slot (block 418).

The current node 102 performs the same processing for frames received from channel 1. When the current node 102 determines that the current node 102 is not scheduled to transmit during the current time slot and neither of the current node's neighbors are scheduled to transmit during the current time slot and the current node 102 starts to receive a frame from the current node's clockwise neighbor on channel 1 (checked in block 420 of FIG. 4B), the current node 102 compares the frame being received from the current node's clockwise neighbor on channel 1 to any frame that is being received from the current node's clockwise neighbor's neighbor on channel 1 (block 422). In the embodiment shown in FIG. 4, a bit-by-bit comparison is performed. Moreover, because the frames will likely be received at the current node 102 at slightly different times, de-skew functionality is used to de-skew the received frames. The current node 102 relays the frame that is being received from the current node's clockwise neighbor on channel 1 to the current node's counter-clockwise neighbor and counter-clockwise neighbor's neighbor along the channel 1 (block 424). After the current frame has been relayed and the comparison is complete, the current node 102 relays information indicative of the results of the comparison in or after the frame received from the current node's clockwise neighbor (block 426). The current node 102 relays the information indicative of the results of the comparison to the current node's counter-clockwise neighbor and counter-clockwise neighbor's neighbor along the channel 1. In one embodiment, an appended integrity field is used. In another embodiment, a shared integrity field is used.

If the current node 102 does not receive a frame from the current node's clockwise neighbor on channel 1 (for example, after a predetermined time-out period has elapsed) but starts to receive a frame from the current node's clockwise neighbor's neighbor on channel 1 (checked in block 428), the current node 102 relays the frame that is being received from the current node's clockwise neighbor's neighbor on to the current node's counter-clockwise neighbor and counter-clockwise neighbor's neighbor along the channel 1 (block 430). After that frame has been relayed, the current node 102 relays in or after that frame information indicating that there was a "mismatch" at the current node 102 for channel 1 (block 432). The current node 102 relays this information to the current node's counter-clockwise neighbor and counter-clockwise neighbor's neighbor along the channel 1. Because no frame was received from the clockwise neighbor of the current node 102, it is not the case that a frame received from the clockwise neighbor is identical to the frame received from the clockwise neighbor's neighbor of the current node 102.

If the current node 102 does not receive a frame from the current node's clockwise neighbor on channel 1 or from the current node's clockwise neighbor's neighbor on channel 1, the current node 102 does not relay any data along channel 1 for the current time slot (block 434).

In one example, the current node 102 is node A and node E is the node that is scheduled to transmit during the current time slot. In such an example, node A receives a frame from node B (node A's counter-clockwise neighbor) via the respective direct link 108 of channel 0 and compares this frame to any frame node A receives from node C (node A's counter-clockwise neighbor's neighbor) via the respective skip link 108 of channel 0. Node A relays the frame that is being received from node B and the information indicative of the results of the comparison to node H (node A's next neighbor along channel 0) and to node G (node A's next neighbor's neighbor along channel 0). In such an example, node A also receives a frame from node H (node A's clockwise neighbor) via the respective direct link 108 of channel 1 and compares this frame to any frame node A receives from node G (node A's clockwise neighbor's neighbor) via the respective skip link 108 of channel 1. Node A relays the frame received from node H and the information indicative of the results of the comparison to node B (node A's next neighbor along channel 1) and to node C (node A's next neighbor's neighbor along channel 1).

In the embodiments illustrated in FIG. 4, if frames are received by the current node 102 on both the direct link 108 and the skip link 108, the current node 102 relays the frame received on the direct link 108. In other embodiments, if frames are received by the current node 102 on both the direct link 108 and the skip link 108, the current node 102 relays the frame received on the skip link 108.

Figure 5:
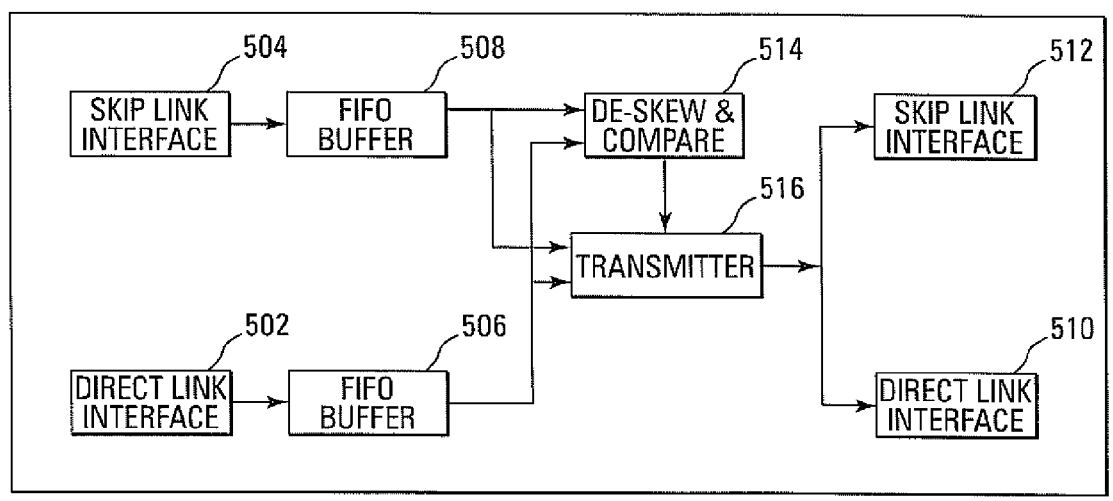
FIG. 5 is a block diagram illustrating logical components of a node that are used to implement, in one example, the comparison and relaying processing of the methods and shown in FIGS. 3 and 4A-4B.

FIG. 5 is a block diagram illustrating logical components of a node 102 that are used to implement, in one example, the comparison and relaying processing of methods 300 and 400 of FIGS. 3 and 4A-4B, respectively. The node 102 that is performing the particular comparison and relaying processing is referred to, in the context of FIG. 5, as the current node 102. The logical components of the current node 102 used to the perform comparison and relaying processing for frames received on channel 0 are shown in FIG. 5. It is to be understood the comparison and relaying processing for frames received on channel 1 are performed using logical components similar to those shown in FIG. 5.

In the example shown in FIG. 5, the current node 102 includes a first direct link interface 502 that communicatively couples the current node 102 to the counter-clockwise direct link 108 of channel 0, which is connected to the current node's counter-clockwise neighbor. The current node 102 also includes a first skip link interface 504 that communicatively couples the current node 102 to the counter-clockwise skip link 108 of channel 0, which is connected to the current node's counter-clockwise neighbor's neighbor. A direct link first-in-first-out (FIFO) buffer 506 is coupled to the first direct link interface 502 and a skip link FIFO buffer 508 is coupled to the first skip link interface 504. The first direct link interface 502 and the first skip link interface 504 receive data from the direct link 108 and the skip link 108, respectively, and store the received data in the direct link FIFO buffer 506 and the skip link FIFO buffer 508, respectively.

The current node 102 includes a second direct link interface 510 that communicatively couples the current node 102 to the clockwise direct link 108 of channel 0, which is connected to the current node's clockwise neighbor. The current node 102 also includes a second skip link interface 512 that communicatively couples the current node 102 to the clockwise skip link 108 of channel 0, which is connected to the current node's clockwise neighbor's neighbor.

In the example shown in FIG. 5, the current node 102 includes a de-skew and compare module 514 that "de-skews" and compares the frames received from the current node's counter-clockwise neighbor and counter-clockwise neighbor's neighbor. In the particular example shown in FIG. 5, the current node 102 includes a single transmitter 516 that is used to transmit data to both the current node's clockwise neighbor and the current node's clockwise neighbor's neighbor. The output of the transmitter 516 is coupled to both the second direct link interface 510 and the second skip link interface 512 in order to transmit to the current node's clockwise neighbor and the current node's clockwise neighbor's neighbor, respectively.

For given transmission during a given time slot, the current node 102 will typically receive start receiving respective frames on the first direct link interface 502 and the first skip link interface 504 at different times. For example, where the comparison and relaying processing is performed in connection with blocks 406-410 and 414-418 of FIG. 4, the current node 102, for a given transmission, will typically start receiving a frame on the first skip link interface 504 before the current node 102 starts receiving a corresponding frame on the first direct link interface 502. This is because, in such an example, the frame received at the first skip link interface 504 travels through one less hop than the frame received on the first direct link interface 502 (that is, the frame received on the first skip link interface 504 "skips" the current node's counter-clockwise neighbor).

In the example shown in FIG. 5, the de-skew and compare module 514 and the transmitter 516 wait until both FIFO buffers 506 and 508 are half full before performing the comparison and relaying of the received data. In other embodiments, other de-skew techniques are used in addition to or instead of the one described above.

In the particular example shown in FIG. 5, a bit-by-bit comparison of the two received frames is performed by the de-skew and compare module 514.

As data is received at the first direct link interface 502, the received data is written into the input end of the direct link FIFO buffer 506. Also, as data is received at the skip link interface 504, the received data is written into the input end of the skip link FIFO buffer 508. The determination as to whether a frame is being received on the first direct link interface 502 is made by detecting a start-of-frame delimiter in the data received from that interface 502. Likewise, the determination as to whether a frame is being received on the first skip link interface 504 is made by detecting a start-of-frame delimiter in the data received from that interface 504.

If a frame is being received on both the first direct link interface 502 and the first skip link interface 504, when both FIFO buffers 506 and 508 are half full, the de-skew and compare module 514 starts receiving bits from the respective outputs ends of the first and second FIFO buffers 506 and 508 and the transmitter 516 start receiving bits from the output end of the FIFO buffer 506. The de-skew and compare module 514, as it receives bits from the first and second FIFO buffers 506 and 508, performs the bit-by-bit comparison of the two received frames. The transmitter 516, as it receives bits from the first FIFO buffer 506, relays the received bits along channel 0 to the counter-clockwise neighbor and counter-clockwise neighbor's neighbor. When the de-skew and compare module 514 has compared the end of both frames, the de-skew and compare module 514 outputs, to the transmitter 516, a bit that indicates whether the two frames were or were not identical. The transmitter 516 receives the bit output by the de-skew and compare module 514 and "appends" the bit to the end of the relayed frame by transmitting the bit after the relayed frame.

If a frame is being received on the first direct link interface 502 but not on the first skip link interface 504, when the first FIFO buffer 506 is half full, the de-skew and compare module 514 and the transmitter 516 start receiving bits from the output end of the first FIFO buffer 506. The de-skew and compare module 514 outputs, to the transmitter 516, a bit that indicates that a mismatch has occurred for channel 0 at the current node 102. The transmitter 516, as it receives bits from the first FIFO buffer 506, relays the received bits along channel 0 to the counter-clockwise neighbor and counter-clockwise neighbor's neighbor. The transmitter 516 receives the bit output by the de-skew and compare module 514 and "appends" the bit to the end of the relayed frame by transmitting the bit after the relayed frame.

In the case of processing performed for method 400 of FIG. 4, if a frame is being received on the first skip link interface 504 but not on the first direct link interface 502, when the second FIFO buffer 508 is half full, the de-skew and compare module 514 and the transmitter 516 start receiving bits from the output end of the second FIFO buffer 508. The de-skew and compare module 514 outputs, to the transmitter 516, a bit that indicates that a mismatch has occurred for channel 0 at the current node 102. The transmitter 516, as it receives bits from the second FIFO buffer 508, relays the received bits along channel 0 to the counter-clockwise neighbor and counter-clockwise neighbor's neighbor. The transmitter 516 receives the bit output by the de-skew and compare module 514 and "appends" the bit to the end of the relayed frame by transmitting the bit after the relayed frame.

Embodiments of network 100 provide improved fault tolerance while the nodes 102 of the network 100 are operating in a synchronous mode. For example, embodiments of network 100 provide improved transport availability and improved transport integrity. Improved transport availability is provided by, for example, the use of the two, independent opposing communication channels 0 and 1. Data that is transmitted by a node 102 in the network 100 travels to each of the other nodes 102 in the network 100 via two independent communication paths. For example, data transmitted by node A of the network 100 travels to node E via a first path traveling counter-clockwise on channel 0 from node A to nodes B, C, D, and E and via a second path traveling clockwise on channel 1 from node A to nodes H, G, F, and E. As a result, despite any single point of failure on one of these paths, there will be another path by which data can successfully travel to node E.

In the embodiment shown in FIGS. 1-4, a CRC protocol field is included in each frame that is transmitted around the network 100. Such CRC fields are well-suited for addressing random errors. Errors resulting from noise on the direct links 108 between a transmitting node and the transmitting node's clockwise neighbor and counter-clockwise neighbor have such a random nature. However, errors introduced by an active inter-stage may be correlated in nature, such that a CRC field may not be well-suited for addressing such errors. The bit-by-bit comparison performed by a node 102 when performing the processing of method 400 will detect any errors introduced by a previous node, thereby addressing such active inter-stage induced errors. Relaying in this manner improves transport integrity in the network 100.

Figure 6:
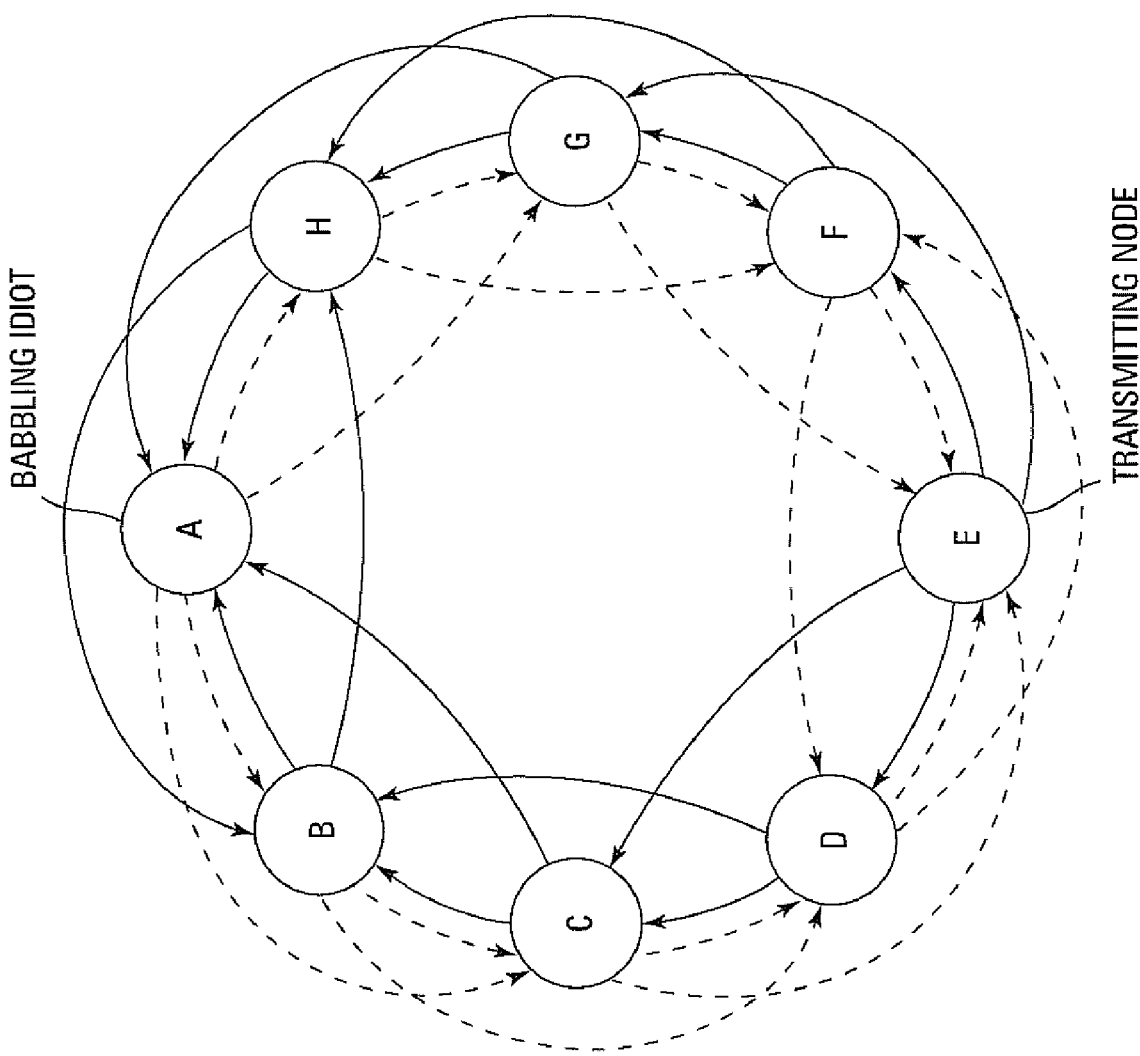
FIG. 6 is block diagram illustrating one example of a babbling idiot fault occurring in the network of FIG. 1 while such nodes are operating in a synchronized mode.

FIG. 6 is block diagram illustrating one example of a babbling idiot fault occurring in the network 100 of FIG. 1 while such nodes 102 are operating in a synchronized mode. In the example shown in FIG. 6, each node 102 in the network 100 implements the methods 200, 300, and 400 of FIGS. 2-4. In this example, node A has a babbling idiot fault during the time slot in which node E is scheduled to transmit. The fault causes node A to transmit to node A's clockwise neighbor node H along channel 0 and to node A's counter-clockwise neighbor node B along channel 1. When node H receives from channel 0 the frame transmitted by node A, the comparison that node H performs between the frame received from node A (node H's counter-clockwise neighbor) and the frame received from node B (node H's counter-clockwise neighbor's neighbor) will indicate that the two frames are not identical. As result, node H relays on channel 0 the frame received from node A along with information indicating that a mismatch occurred at node H. Likewise, when node B receives from channel 1 the frame transmitted by node A, the comparison that node B performs between the frame received from node A (node B's clockwise neighbor) and the frame received from node B (node B's clockwise neighbor's neighbor) will indicate that the two frames are not identical. As result, node B relays on channel 1 the frame received from node A along with information indicating that a mismatch occurred at node H.

The links 108 of channel 0 and channel 1 that are affected by node A's transmission are shown in FIG. 6 using dashed lines. The direct link 108 in channel 0 from node A to node H and the direct and skip links 108 in channel 0 from nodes H to node G, from node G to node F, and from node F to node E are affected by the faulty transmission by node A. The direct link 108 in channel 1 from node A to node B and the direct and skip links 108 in channel 1 from node C, from node C to node D, and from node D to node E are affected by the faulty transmission by node A.

Data transmitted by node E along channel 0 is received and relayed by nodes D, C, and B because the links 108 in this part of channel 0 are not affected by node A's transmissions. Likewise, data transmitted by node E along channel 1 is received and relayed by nodes F, G, and H because the links 108 in this part of channel 1 are not affected by node A's transmissions. The links 108 of channel 0 and channel 1 that are not affected by node A's transmissions and over which node E is able to transmit successfully are shown in FIG. 6 using solid lines. In this way, data transmitted by node E is able to reach each of the nodes 102 in the ring 104 despite the babbling idiot fault occurring at node A.

In another example, a slightly-off-specification (SOS) failure or fault occurs in the communication network 100 of FIG. 1 while the nodes 102 are operating in a synchronized mode. A SOS fault occurs when a frame is received within the receive window of some nodes 102 in the network 100 and slightly outside the receive window of other nodes 102 in the network 100. Upon the occurrence of an SOS failure, the former set of nodes 102 accept the frame as a correct frame while the latter set of nodes 102 reject the frame as an incorrect frame. In other words, different sets of correct nodes 102 in the network 100 will have a different view of the same frame, which is undesirable.

In this example, a SOS failure occurs in node A. In such a failure, during the time slot assigned to node A for node A to transmit, faulty node A transmits at a point in time that would (if node A's transmissions were relayed fully around the ring 104) result in nodes B, C, H and G receiving the transmission as correct and nodes D, E, and F receiving the transmission as incorrect.

Nodes B and H, as neighbors of node A, will check if the transmission by node A complies with the temporal policy implemented in the network 100. In such an example, node B will determine that the frame received from node A on channel 1 does not comply with the temporal policy and, therefore, will not relay the frame any further along channel 1. Likewise, node H will determine that the frame received from node A on channel 0 does not comply with the temporal policy and, therefore, will not relay the frame any further along channel 0. In this way, the impact of such SOS failures is reduced.

Figure 12:
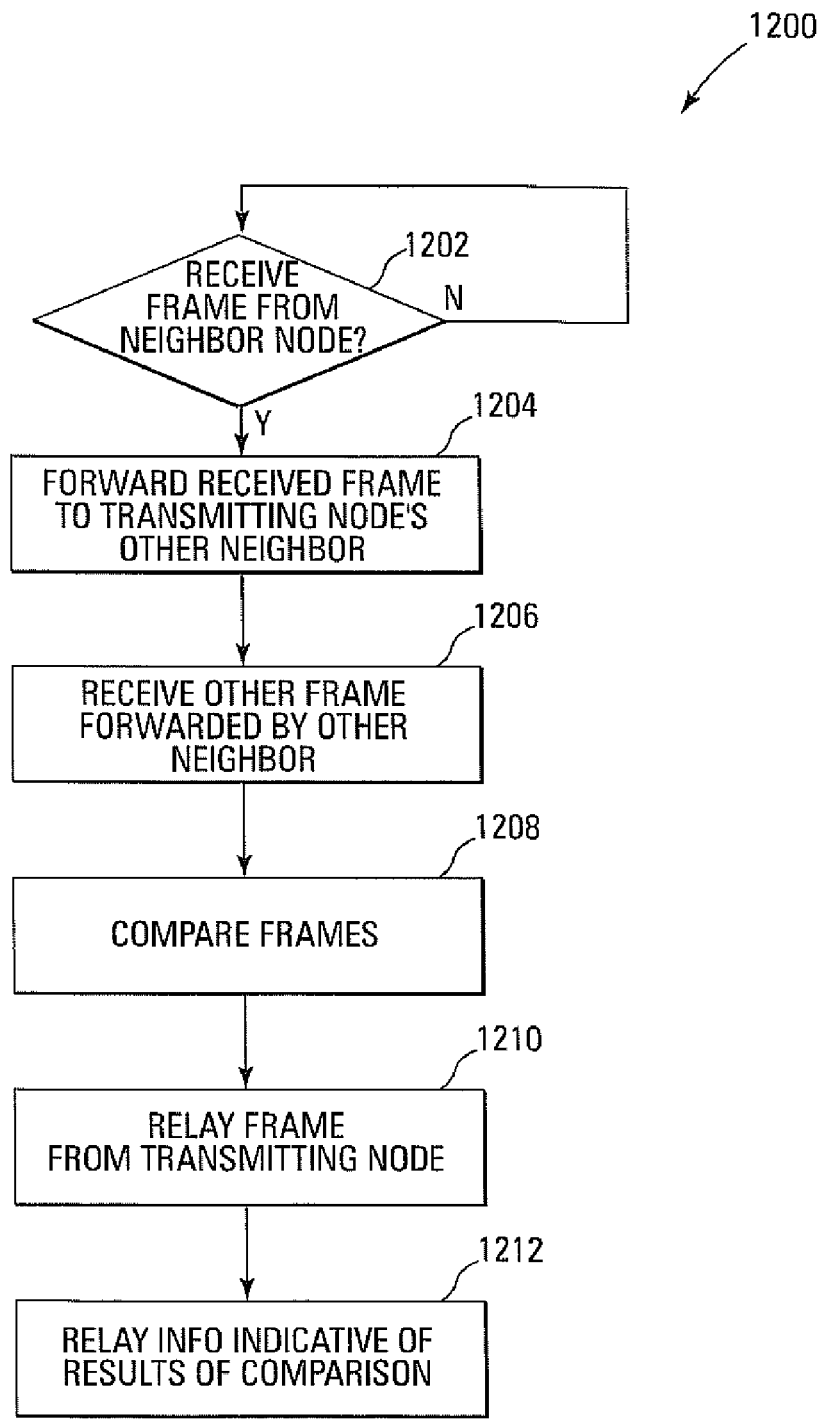
FIG. 12 is a flow diagram of one embodiment of a method of detecting directional integrity in the network of FIG. 1.

FIG. 12 is a flow diagram of one embodiment of a method of detecting directional integrity in the network 100 of FIG. 1. Although the embodiment of method 1200 shown in FIG. 12 is described here as being implemented using the network 100 shown in FIG. 1, other embodiments are implemented in other networks and in other ways. In the context of FIG. 12, the node 102 that is performing the processing of method 1200 is referred to here as the "current" node 102. In one embodiment, at least a portion of the functionality described here as being performed by the current node 102 is implemented in a controller included in the node 102. Other embodiments of method 1200 are implemented in other ways.

When a given node 102 (referred to here in the context of FIG. 12 as the "transmitting" node 102) transmits data, each of the neighbor nodes of the transmitting node 102 perform method 1200 in order to determine if the transmitting node 102 is transmitting the same data on both channels 0 and 1 of the network 100 (that is, whether there the transmitting node 102 is transmitting with directional integrity). Method 1200 can be performed, for example, when the nodes 102 in the network 100 are operating in a synchronized mode in which the nodes transmit in accordance with a TDMA schedule. In such an embodiment, method 1200 can be performed by the neighbor nodes in addition to the processing described above in connection with FIG. 3A or FIG. 3B. Method 1200 can also be performed, for example, when the nodes 102 in the network 100 are operating in an unsynchronized mode (for example, during system startup). In such an embodiment, method 1200 can be performed in addition to the processing described in the 10/993,931 Application.

When the transmitting node 102 transmits, both neighbors of the transmitting node exchange the respective frames they receive from the transmitting node over the skip links 108 that communicatively couple the neighbors to one another. As shown in FIG. 12, when the current node 102 receives a frame sourced from one of its neighbors (checked in block 1202), the current node 102 forwards the frame it is receiving from that neighbor (that is, from the transmitting node) to the other neighbor of the transmitting node (block 1204). The current node 102 receives the frame from the transmitting node 102 from the direct link 108 that communicatively couples the current node 102 to the transmitting node. In the context of claim 12, the channel on which the current node 102 receives the frame from the transmitting node 102 is referred to here as the "current channel." The current node 102 forwards the frame it receives from the transmitting node to the other neighbor of the transmitting node 102 over the skip link 108 that communicatively couples the current node 102 to the other neighbor in channel other than the current channel.

The other neighbor of the transmitting node forwards the frame it receives from the transmitting node to the current node 102 over the other skip link 108 that communicatively couples the other neighbor to the current node 102 in the current channel. In the context of FIG. 12, the frame forwarded to the current node 102 by the other neighbor of the transmitting node is also referred to here as the "other frame." The current node 102 receives the other frame (block 1206). The current node 102 compares the frame it is receiving from the transmitting node to the other frame it is receiving from the other neighbor (block 1208). In one embodiment, this comparison is a bit-for-bit comparison.

The current node 102 relays the frame it is receiving from the transmitting node 102 along the current channel (block 1210). For example, when the transmitting node 102 is the clockwise neighbor of the current node 102, the current node 102 receives the frame from the transmitting node 102 via channel 1 and relays the received frame along channel 1 to the counter-clockwise neighbor and neighbor's neighbor of the current node 102. When the transmitting node 102 is the counter-clockwise neighbor of the current node 102, the current node 102 receives the frame from the transmitting node 102 via channel 0 and relays the received frame along channel 0 to the clockwise neighbor and neighbor's neighbor of the current node 102.

After the entire frame transmitted by the transmitting node has been relayed by the current node 102 and the comparison between that frame and the other frame forwarded to the current node 102 by the other neighbor is complete, the current node 102 relays information indicative of the results of that comparison in or after the frame received from the transmitting neighbor along the current channel (block 1212). In one embodiment, the information indicative of the results of the comparison comprises a one-bit, appended integrity field that the current node 102 appends to the frame received from the transmitting node in the manner described above in connection with FIGS. 4A-4B and 5. In another embodiment, a shared integrity field is included at the end of each frame in the manner described above in connection with FIGS. 4A-4B and 5.

For example, where the transmitting node is node A of FIG. 1 and the current node is node B, the other neighbor of the transmitting node is node H. In such an example, the current node (node B) forwards the frame it receives from node A to the other neighbor (node H) over the skip link 108 of channel 0, which communicatively couples node B to node H. Likewise, the other neighbor (node H) forwards the frame it receives from node A to the current node (node B) over the skip link 108 of channel 1, which communicatively couples node H to node B. Node B compares the frame it receives from node A to the frame it receives from node H. Node B relays the frame received from node A along channel 1 to node C (the counter-clockwise neighbor of node B) and to node D (the counter-clockwise neighbor's neighbor of node B). When the node B has relayed the entire frame received from node A and has completed the comparison, node B appends (in this example) a one-bit field to the relayed frame.

Figure 7:
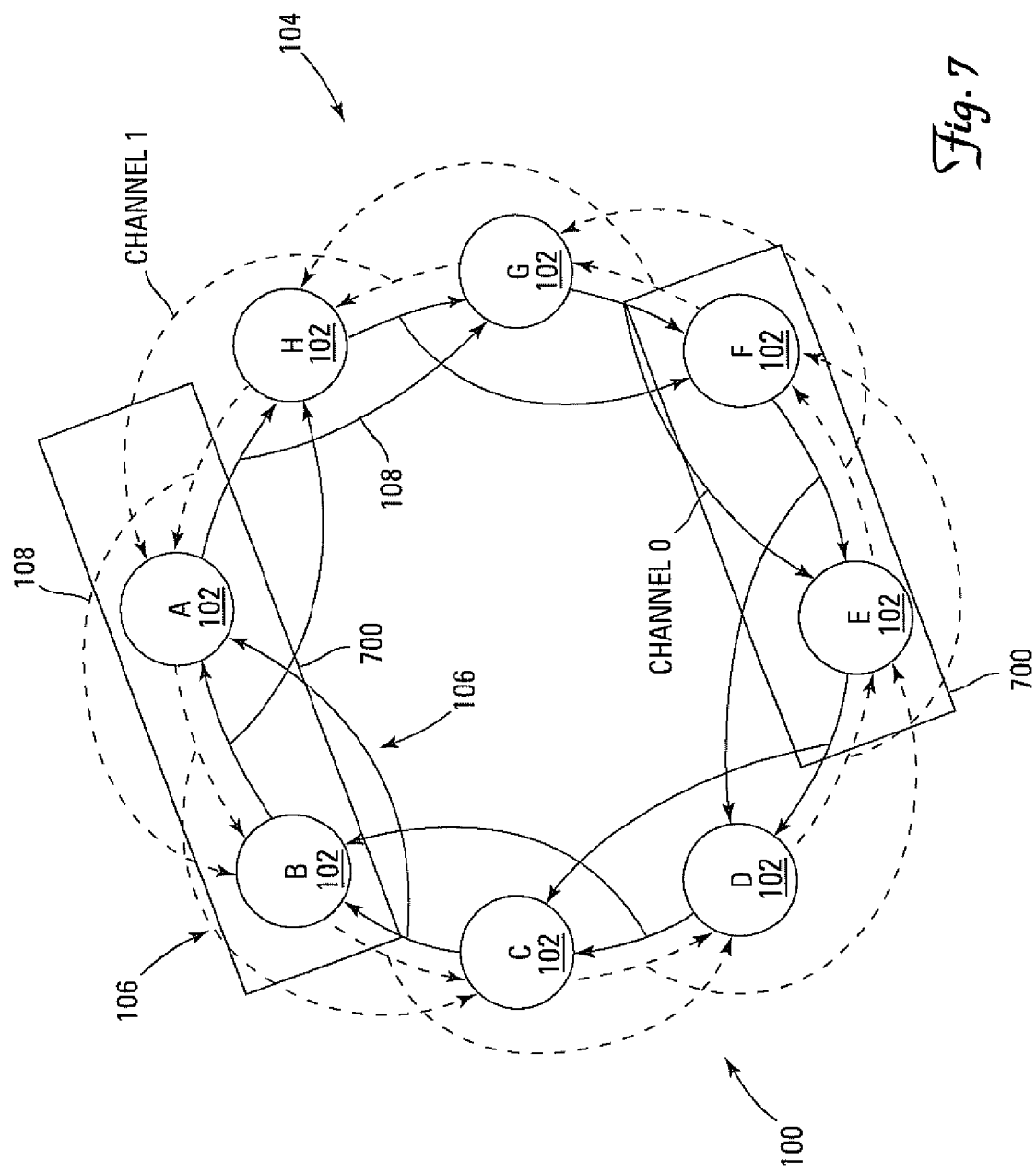
FIG. 7 is a block diagram of one embodiment of the network of FIG. 1 that is configured, at the application layer, to implement self-checking pairs.

In one embodiment, higher-layer functionality implemented on top of the transport-layer functionality described above in connection with FIGS. 2-6 and 12 takes advantage of various features of such transport-layer functionality. In the exemplary embodiments described in connection with FIGS. 7-10, such high-layer functionality is implemented so as to use one or more of the features provided by the transport-functionality described above in connection with FIGS. 2-6 and 12 to mitigate value-domain frame errors occurring within the application layer. FIG. 7 is a block diagram of one embodiment of the network 100 of FIG. 1 that is configured, at the application layer, to implement self-checking pairs. Each of the individual nodes 102 implements at least a portion of the transport-layer functionality described above in connection with FIGS. 2-6 and 12. At the application layer, one or more self-checking pairs 700 are established in the network 100. For example, in the embodiment shown in FIG. 7, a self-checking pair 700 is established for nodes A and B (also referred to here individually as "pair A/B") and another self-checking pair 700 is established for nodes E and F (also referred to here individually as "pair E/F").

In each self-checking pair 700, the two nodes 102 of each pair are required to act, at the application layer, in a replica-deterministic fashion such that the output of each node 102 is bit-for-bit identical. This enables straightforward bit-for-bit voting. In one embodiment, where pure computation-based replication is implemented, replica-determinism requires that the nodes 102 in the pair have both an identical internal state vector (that is, identical history state) and have agreed upon an input-data vector that is used for the next frame of computation. Typically, nodes of a self checking pair perform one or more comparison operations (in an operation commonly referred to as a "voting" or "selection" operation) in order to determine which of multiple instances of received data should be used in the processing performed by the self checking pair. In the embodiment shown in FIG. 7, the comparisons performed in the transport-layer processing described above in connection FIGS. 1-6 and 12 are leveraged to implement such voting or selection operations performed by such self checking pairs 700.

Figure 8:
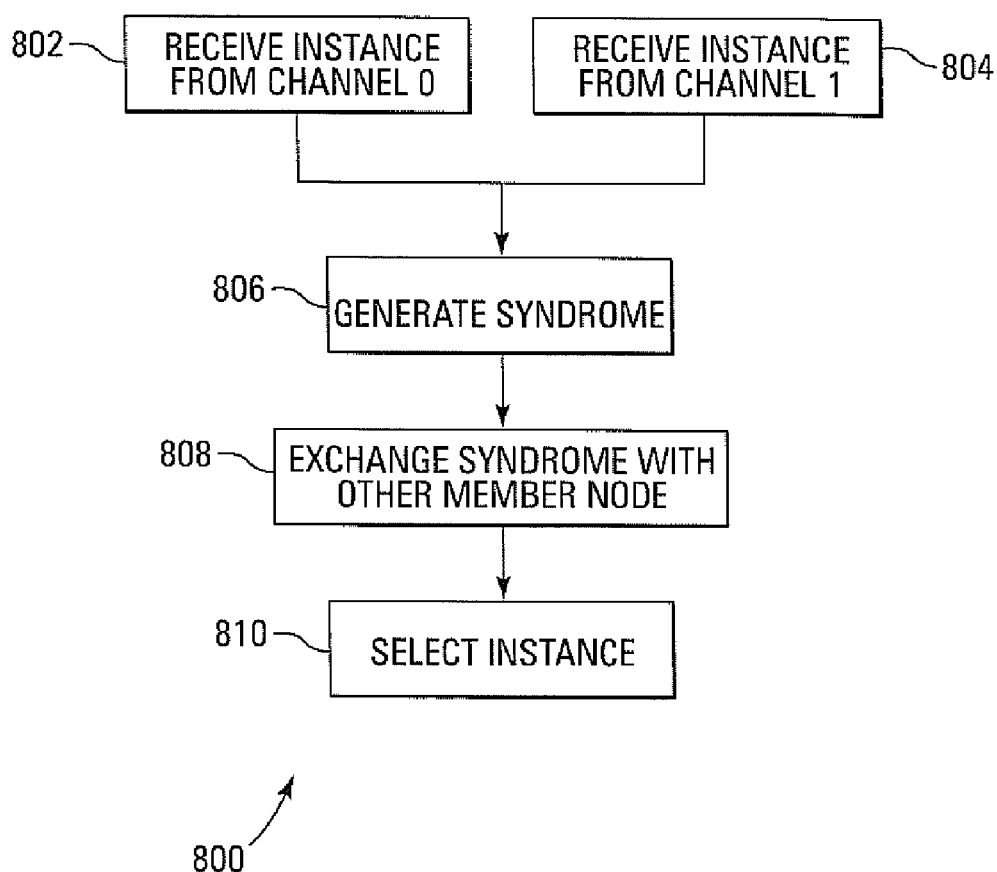
FIG. 8 is a flow diagram of one embodiment of a method that implements at least a portion of the higher-layer processing performed by a member of self checking pair.

FIG. 8 is a flow diagram of one embodiment of a method 800 that implements at least a portion of the higher-layer processing performed by a member of self checking pair 700. In the embodiment shown in FIG. 8, each of the nodes 102 in the network 100 implements, at the transport layer, at least a portion of the processing described above in connection with FIGS. 2-6 in order to transmit, relay, and receive frames on the network 100. In the context of FIG. 8, the node 102 that is performing the processing of method 800 is referred to here as the "current" node 102. The self checking pair 700 of which the current node 102 is a member is also referred to here as the "current" pair 700. In one embodiment, at least a portion of the functionality described here as being performed by the current node 102 is implemented in a controller included in the node 102. Other embodiments of method 800 are implemented in other ways.

Method 800 is performed by the current node 102 for each transmitted frame that is causal to a replica-determinate computation performed by the current pair 700. When a frame is transmitted in network 100, transport-layer functionality implemented at the current node 102 supplies to the application-layer functionality implemented on the current node 102 up to two instances of the transmitted frame—one instance "received" from channel 0 (block 802) and one instance "received" from channel 1 (block 804). In the particular embodiment shown in FIG. 8, for a given channel, the instance of the transmitted frame that the transport-layer functionality provides to the application-layer functionality is the instance of the transmitted frame that the transport-layer functionality relays along that channel (for example, as described above in connection with FIGS. 3A-3B and 4A-4B). Such an instance will include one or more comparison status indicators appended to or included in the instance of the transmitted frame. If the comparison status indicators for such an instance indicate that a mismatch did not occur at the current node 102 or at any previous node 102 along the channel from which the instance was received, the instance is referred to here as having been received "with integrity." If the comparison status indicators for such an instance indicate that a mismatch did occur at the current node 102 or at any previous node 102 along the channel from which the instance was received, the instance is referred to here as having been received "without integrity."

For each instance of a transmitted frame received with integrity from a channel, the current node 102 assumes that all previous nodes 102 along that channel have received the same data for the transmitted frame from that channel. For example, when node A receives an instance of a transmitted frame with integrity from channel 0, node A assumes that node B (a previous node along channel 0) has received from channel 0 the same data for the transmitted frame. Likewise, when node B receives an instance of the transmitted frame with integrity from channel 1, node B assumes that node A (a previous node along channel 1) has received the same data for the transmitted frame from channel 1.

In the embodiment shown in FIG. 8, for each transmitted frame that is causal to a replica-determinate computation performed by the pair 700, the member nodes 102 of the pair 700 exchange a 3-bit vector (also referred to here as a "syndrome"). Each member node 102 of the current pair 700 generates a syndrome based on the instance of the transmitted frame received from channel 0 and the instance of the transmitted frame received from channel 1. Each syndrome includes one bit that indicates whether the node 102 that generated the syndrome received an instance of the transmitted frame from channel 0 with integrity (also referred to here as the "channel-0 bit"), one bit that indicates whether that node 102 received an instance of the transmitted frame from channel 1 with integrity (also referred to here as the "channel-1 bit"), and one bit that indicates whether the instance received from channel 0 matches the instance received from channel 1. The member nodes 102 of the self-checking pair 700 exchange syndromes, which are used by each member node 102 to select which instance of the transmitted frame to use for the next replica-determinate computation performed by that pair 700.

In the embodiment shown in FIG. 8, the current node 102 generates a syndrome based on the instance of the transmitted frame received from channel 0 and the instance of the transmitted frame received from channel 1 (block 806). The current node 102 and the other member node 102 of the current pair exchange syndromes (block 808). The syndromes are exchanged using the direct links 108 in channels 0 and 1 between the current node and the other member node of the current pair 700 and, therefore, no additional connectivity is required between the member nodes 102 of the current pair 700 for syndrome exchange.

Figure 9:
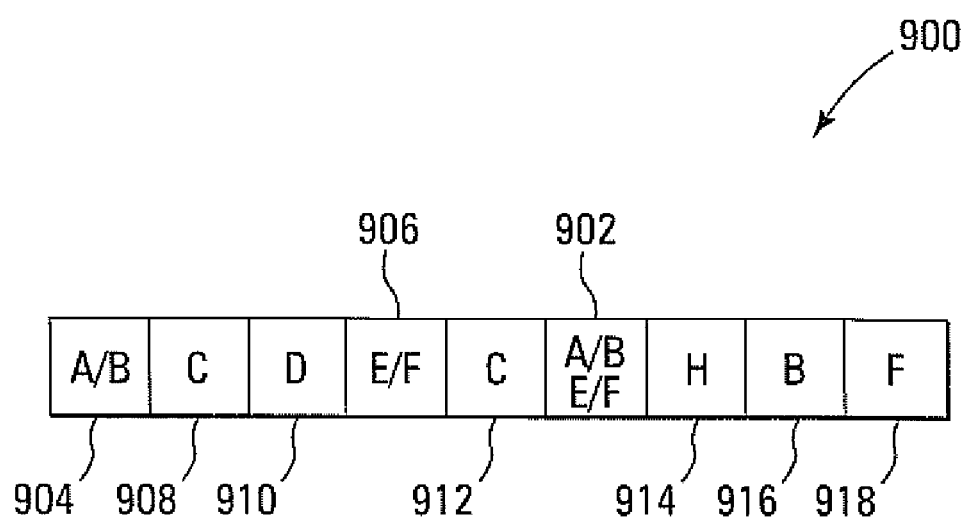
FIG. 9 illustrates one example of a TDMA schedule for the network of FIG. 7.

In one embodiment, the syndrome exchange occurs during a predetermined time slot. One example of a TDMA schedule 900 for the network 100 of FIG. 7 is illustrated in FIG. 9. The schedule 900 includes a time slot 902 that is assigned to each of the self checking pairs 700 of FIG. 7 to exchange syndromes. In the example shown in FIG. 8, pair A/B and pair E/F exchange syndromes during time slot 902. In one embodiment, the same transport-layer functionality used for "regular" time slots is used for the syndrome exchange transmissions. In such an embodiment, when pairs A/B and E/F exchange syndromes during time slot 902, the other nodes 102 in the network 100 are configured to ignore any frames they receive during that time slot 902.

In one embodiment, for each frame that is transmitted on the network 100 that is causal to a replica-determinate computation performed by the current pair 700, the generation and exchange of syndromes by the members of the current pair 700 occurs during the particular time slot in which such frame is transmitted. In another embodiment, the members of a current pair 700 receive all frames for a given schedule round then generate and exchange a single composite syndrome for all the received frames that are causal to a replica-determinate computation performed by the current pair 700.

Figure 10:
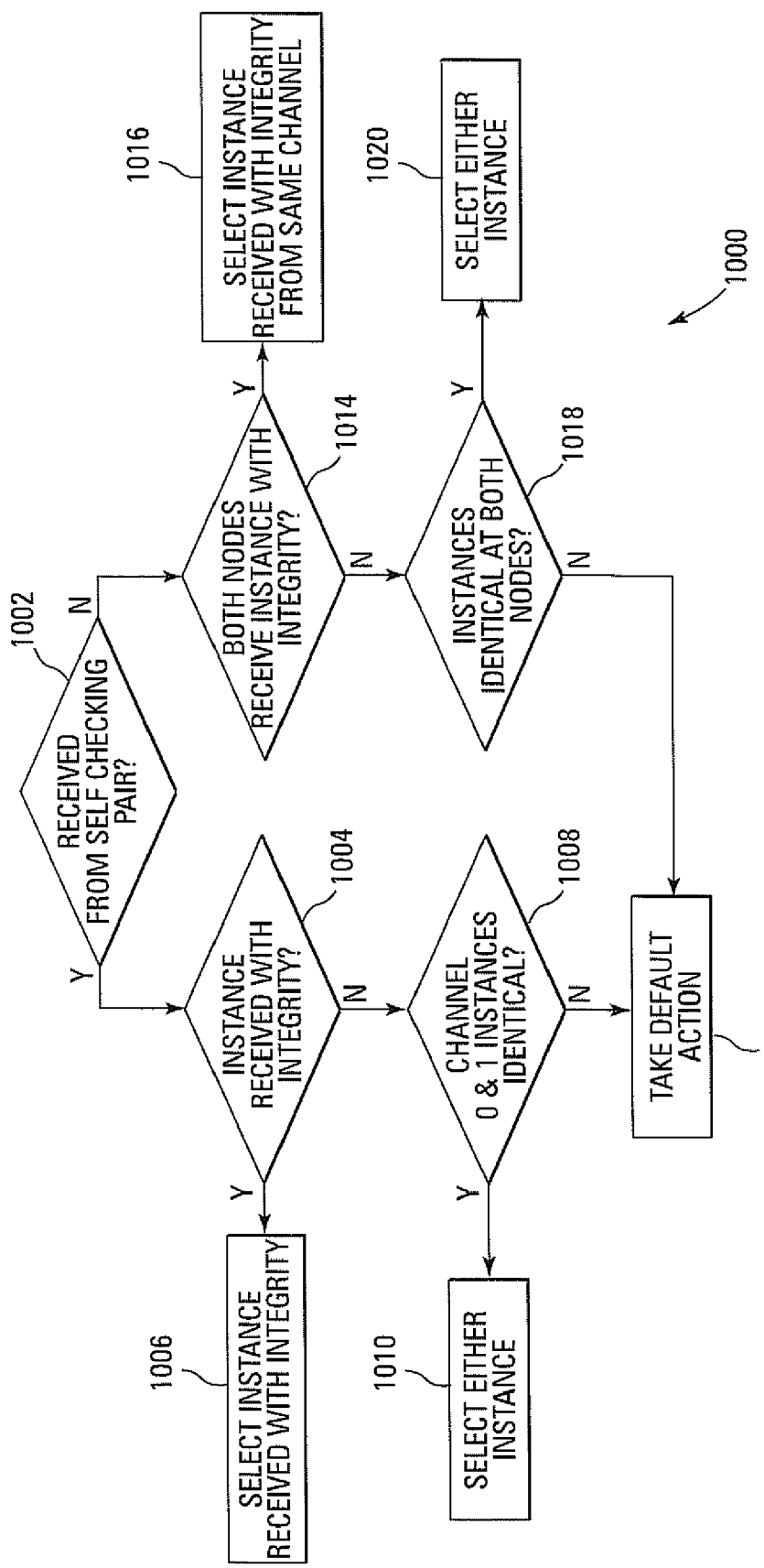
FIG. 10 is a flow diagram of one embodiment of a method of selecting an instance of a transmitted frame for use in a replica-deterministic computation performed by a self checking pair of FIG. 7.

In the embodiment shown in FIG. 8, after exchanging syndromes, the current node 102 (and the other member node 102 of the current pair 700) select which instance of the transmitted frame to use in the replica-deterministic computation to be performed by the current pair 700 (that is, by each member node 102 of the current pair 700) (block 810). One example of a method of selecting an instance of the transmitted frame is shown in FIG. 10. It is to be understood, however, that other embodiments are implemented in other ways.

FIG. 10 is a flow diagram of one embodiment of a method 1000 of selecting an instance of a transmitted frame for use in a replica-deterministic computation performed by a self checking pair 700 of FIG. 7. Embodiments of method 1000 are implemented in each member node 102 of a self-checking pair 700. In the context of FIG. 10, the node 102 that is performing the processing of method 1000 is referred to here as the "current" node 102. The self checking pair 700 of which the current node 102 is a member is also referred to here as the "current" pair 700. In one embodiment, at least a portion of the functionality described here as being performed by the current node 102 is implemented in a controller included in the node 102. Other embodiments of method 1000 are implemented in other ways.

Method 1000 is performed by the current node 102 for each transmitted frame that is causal to a replica-determinate computation performed by the current pair 700 in order to determine which instance of such a transmitted frame received by each member node 102 of the pair 700 should be used in the computation. Method 1000, in the embodiment shown in FIG. 10, is performed after the instances for a given frame have been received, and corresponding syndromes have been generated and exchanged, by the member nodes 102.

In the embodiment shown in FIG. 10, the current node 102 first checks if the source of the transmitted frame is a self checking pair (or other high-integrity source) (block 1002). In such an embodiment, the selection of which instance of a transmitted frame to use is dependent on the nature of the source of the transmitted the frame. In the embodiment shown in FIG. 10, there are two types of sources—self checking pair nodes 700 and "simplex" sources. When acting as a simplex source, a single node 102 transmits other than as a member of self checking pair 700. In the network 100 shown in FIG. 7, nodes A and B are a part of pair A/B, nodes E and F are a part of pair E/F.

In one implementation, the nature of the source of a transmitted frame is identified by the current node 102 using the TDMA schedule. For example, as shown in FIG. 9, the TDMA schedule 900 includes time slot 904 that is assigned to pair A/B. During time slot 904, nodes A and B transmit a frame, as pair A/B, on channels 0 and 1 of the network 100. Also, schedule 900 includes a time slot 906 that is assigned to pair E/F. During time slot 906, nodes E and F transmit a frame, as pair E/F, on channels 0 and 1 of the network 100. The schedule 900 also includes time slots 908, 910, 912, 914, 916 and 918 that are assigned to nodes C, D, C, H, B, and F, respectively, in which the respective nodes 102 transmit in a simplex manner (that is, not as a member of a self checking pair 700). Note that, in this embodiment, a node may transmit both as a member of a self checking pair and a single, simplex source. For example, nodes B and F transmit as members of pairs A/B and E/F in time slots 904 and 906, respectively, and as simplex sources in time slots 916 and 918, respectively.

In the embodiment of method 1000 shown in FIG. 10, if the source of the transmitted frame is a self checking pair and the current node 102 received at least one instance of the transmitted frame with integrity (checked in block 1004), the current node 102 selects one such instance that was received with integrity for use in performing the replica-deterministic computation (block 1006). When the source of the transmitted frame is a self checking pair 700 and the current node 102 receives an instance of the transmitted frame from a given channel with integrity, the current node 102 assumes that the other member node 102 of the current pair 700 received an identical instance of the transmitted frame from the same channel. Moreover, when the source of the transmitted frame is a self checking pair 700, the current node 102 assumes that the source (that is, the transmitting self checking pair) transmits the same data on both channels and, in the event that the current node 102 receives instances of the transmitted frame with integrity from both channels, the current node 102 assumes that those two received instances are identical to each other and that the other member node 102 of the current pair 700 received instances of the transmitted frame from both channels with integrity and that those received instances are also identical to each other and to the two instances received by the current node 102. Accordingly, in the event that the current node 102 receives instances of the transmitted frame with integrity from both channels, each of the member nodes 102 of the current pair 700 can chose the instance received from either channel and the member nodes 102 of the current pair 700 need not necessarily select the instance received from the same channel. In one implementation, there is a bias in favor of one channel. That is, in the event that the current node 102 receives instances of the transmitted frame with integrity from both channels, the current node 102 selects the instance received from that channel over the other channel (though such a bias in favor of one channel is not required in such a case).

If neither instance of the transmitted frame was received with integrity by the current node 102 and the instance of the transmitted frame received from channel 0 is identical to the instance of the transmitted frame received from channel 1 (checked in block 1008), the current node 102 selects either instance for use in performing the replica-deterministic computation (block 1010). When the source of the transmitted frame is a self checking pair 700 and the instance received by the current node 102 from channel 0 matches the instance received by the current node 102 from channel 1, the current node 102 assumes that both instances received by the other member node 102 of the current pair 700 are identical to each other and are identical to the instances received by the current node 102. Accordingly, in such a situation, each of the member nodes 102 of the current pair 700 can chose the instance received from either channel and the member nodes 102 of the current pair 700 need not necessarily select the instance received from the same channel. In one implementation, there is a bias in favor of one channel (though such a bias in favor of one channel is not required in such a case).

If both instances of the transmitted frame were received by the current node 102 without integrity and the two instances are not identical, the current node 102 takes some default action (block 1012). The particular default action taken by the current node 102 is typically application dependent. For example, in one implementation of such an embodiment, the current node 102 does not perform the replica-deterministic computation. In another implementation, the current node 102 selects some known-good data in place of the transmitted frame for use in performing the replica-deterministic computation (for example, the last known good frame from the same source). In other implementations, other default actions are taken. In such a situation, the current node 102 assumes that the other member node 102 of the current pair 700 has not received an instance of the transmitted frame with integrity from either of the channels and that the two instances received by the other member node 102 are not identical, and, therefore, the other member node 102 will take the same default action as the current node 102 for that transmitted frame.

In the embodiment of method 1000 shown in FIG. 10, if the source of the transmitted frame is not a self checking pair, the current node 102 checks if both the current node 102 and the other member node 102 of the current pair 700 received an instance of the transmitted frame from the same channel with integrity (checked in block 1014). If that is the case, the current node 102 selects such an instance of the transmitted frame for use in performing the replica-deterministic computation (block 1016). In the embodiment shown in FIG. 10, when the source of the transmitted frame is a not a self checking pair (and the directional integrity functionality described above in connection with FIG. 12 is not used) and the current node 102 receives an instance with integrity from both channels, it may nevertheless be the case that the two received instances are not identical. Therefore, in such an embodiment, the member nodes 102 of the current pair 700 have a bias in favor of one of the channels (also referred to here as the "primary channel") such that, in the event that both member nodes 102 of the current pair 700 receive an instance with integrity from both of the channels, both member nodes 102 select the instance received from the primary channel.

In an alternative embodiment, the directional integrity functionality described above in connection with FIG. 12 is used at the transport layer of node 102 in the network 100. In such an alternative embodiment, when the source of the transmitted frame is a not a self checking pair, the integrity information included in each instance will indicate whether the transmitted frame was transmitted with directional integrity. Each member node 102 of the current pair 700, in such an embodiment, when it receives an instance with integrity (including with directional integrity) from one of the channel, assumes that the received instance is identical to any instance received by that node 102 with integrity (including with directional integrity) on the other channel and is identical to any instance received by the other member node 102 with integrity from either channel (including with directional integrity). Accordingly, in such an embodiment, the instance selected by each of the member nodes 102 of the current pair 700 need not be received from the same channel if the respective instances are received by each of the member nodes 102 with integrity (including with directional integrity).

In the embodiment shown in FIG. 10, if it is not the case that both the current node 102 and the other member node 102 of the current pair 700 received an instance of the transmitted frame from the same channel with integrity, the current node 102 checks if the instance received on channel 0 is identical to the instance received on channel 1 for both the current node 102 and the other member node 102 (block 1018). If that is the case, the current node 102 selects either instance for use in performing the replica-deterministic computation (block 1020). In one implementation, there is a bias in favor of one channel. The current node 102 determines if the instance received on channel 0 by the other member node 102 of the current pair 700 is identical to the instance received on channel 1 by the other member node 102 using the syndrome generated by the other member node 102.

If the current node 102 and the other member node 102 did not both receive an instance of the transmitted frame from the same channel with integrity and the current node 102 and the other member node 102 did not both receive identical instances on channels 0 and 1, the current node 102 takes some application-dependent default action (block 1012). In the embodiment shown in FIG. 10, when the source of the transmitted frame is a simplex source, the current node 102 takes the same default action that it takes when the source of the transmitted frame is a self checking pair 600. In other embodiments, the default action taken when the source of the transmitted frame is a simplex source differs from the default action taken when the source of the transmitted frame is a self checking pair 600.

In the embodiment shown in FIGS. 7-10, the instance selection functionality when combined with the implicit coverage of the ring propagation functionality of FIGS. 1-3, ensures that the two member nodes 102 of a self checking pair 600, when performing a replica-deterministic computation, operate on identical data. However such approach does not address local internal failures at member nodes 102 of a pair 700. For example, history state corruption (for example, due to neutron induced bit flips or single event upsets) may also affect computation agreement. To detect such errors, in one embodiment, the syndromes exchanged between member nodes 102 of a pair 700 are extended to include a CRC (or other error detection and/or correction code) of the history state (or other data). The member nodes 102 of a pair 700 use the exchanged CRC data to determine if such an error has occurred by comparing the CRC values. When such an error occurs, the member nodes 102 are able to perform an immediate recovery action (for example, a role back, if previous history data is preserved, or re-integration or mode reversion). The particular recovery action is typically application dependent.

Such history-state CRC functionality, in one embodiment, is used to ensure that the two member nodes 102 of a pair 700 rendezvous successfully on power up. For example, in one implementation, each member node 102 waits until the history state is agreed upon (checked via exchanged CRC values) before commencing replica-deterministic computation (or other processing). In other embodiments, the syndrome includes other information. For example, in one such other embodiment, the syndromes include software and version identifiers. These identifiers are used, for example, in power on processing to ensure that the member nodes 102 of a pair 700 have the same software executing thereon. Once the member nodes 102 of a pair 700 verify that they have the same history state (and/or software), the functionality described above in connection with FIGS. 7-10 and FIGS. 1-3 works to ensure that the member nodes 102 operate in proper replica-deterministic fashion when computation commences.

When a self checking pair 700 of FIG. 7 transmits, the two member nodes 102 must transmit the same frame to the other nodes 102 in the network 100. For maximum coverage, this is verified at the other nodes 102 in the network 100 that receive the frame from the self checking pair 700. In the embodiment shown in FIGS. 7-10, such verification is done using the implicit channel coverage provided in the bus guardian and relay functionality described above in connection with FIGS. 2-6. In one implementation of such an embodiment, the other nodes 102 in the network 100 need not be aware that a self checking pair (as opposed to a simplex source) is transmitting since frames received from either source are processed in the same manner. However, for such an approach to work, the transmissions from the member nodes 102 of a pair 700 need to be suitably closely aligned (that is, to be within the expected nominal propagation delay of the network 100).

Where the precision of a globally agreed fault-tolerant time base is a large number of bit cells (on the order of 1 microsecond to 5 microseconds), a local rendezvous between the two members of the pair is used to achieve the required level of synchronization. In one implementation, a "halt-release" protocol using the direct links 108 is used. In such an implementation, when a self checking pair 700 transmits, the "faster" member node 102 of the pair 700 initially transmits an IDLE preamble at the beginning of the assigned time slot. The faster node 102 continues to send such an IDLE preamble until the faster node 102 detects that the "slower" member node 102 has started its transmission. The slower node, detecting the presence of the faster node 102, sends a minimal preamble, which is only long enough for the faster node to detect and align the start of the faster node's real transmission. The precise time, in one implementation, is configured a priori using a suitable parameter in the global TDMA schedule table. Using this approach (or similar approaches), the time difference between the two member nodes 102 of a transmitting self checking pair 700 can be closely aligned to within the expected nominal propagation delay of the network 100 (for example, around one to three bit cells). By performing such a rendezvous function to closely align the transmissions of the member nodes 102 of a self-checking pair 700, the de-skew and comparison functionality implemented at the other nodes 102 of the network 100 can be utilized without requiring an increase in the FIFO buffer sizes.

In other embodiments, in addition to or instead of a pure computation self checking pair configuration, the direct links 108 between two neighbor nodes 102 are used as "private" channels between those two neighbor nodes 102 in order to exchange and/or agree on other types of data such as local sensor data. In such an embodiment, the entire raw data is exchanged between the two neighbor nodes 102. As with the exchange of the syndromes in time slot 902 of FIG. 9, multiple, different pairs of neighbor nodes 102 in the network 100 can exchange sensor data during the same time slot.

Also, in other embodiments, other hybrid self-checking pair schemes are implemented in which only a subset of the nodes 102, tasks and/or transmissions operate in a replica-determinate fashion. For example, as noted above in connection with FIG. 9, in the embodiment described above in connection with FIGS. 7-10, nodes B and F transmit as members of pairs A/B and E/F in time slots 904 and 906, respectively, and as simplex sources in time slots 916 and 918, respectively. Since each "critical" transmission is characterized in the global time schedule table (for example, by identifying whether the source is self checking pair or a simplex source), the behavior of neighboring nodes is varied from "bus guardian" to member node 102 of a self checking pair 700 from round-to-round and/or from slot-to-slot. For example, node A transmits as a member of pair A/B during time slot 904 and acts as a bus guardian node for node B during time slot 916.

Figure 11:
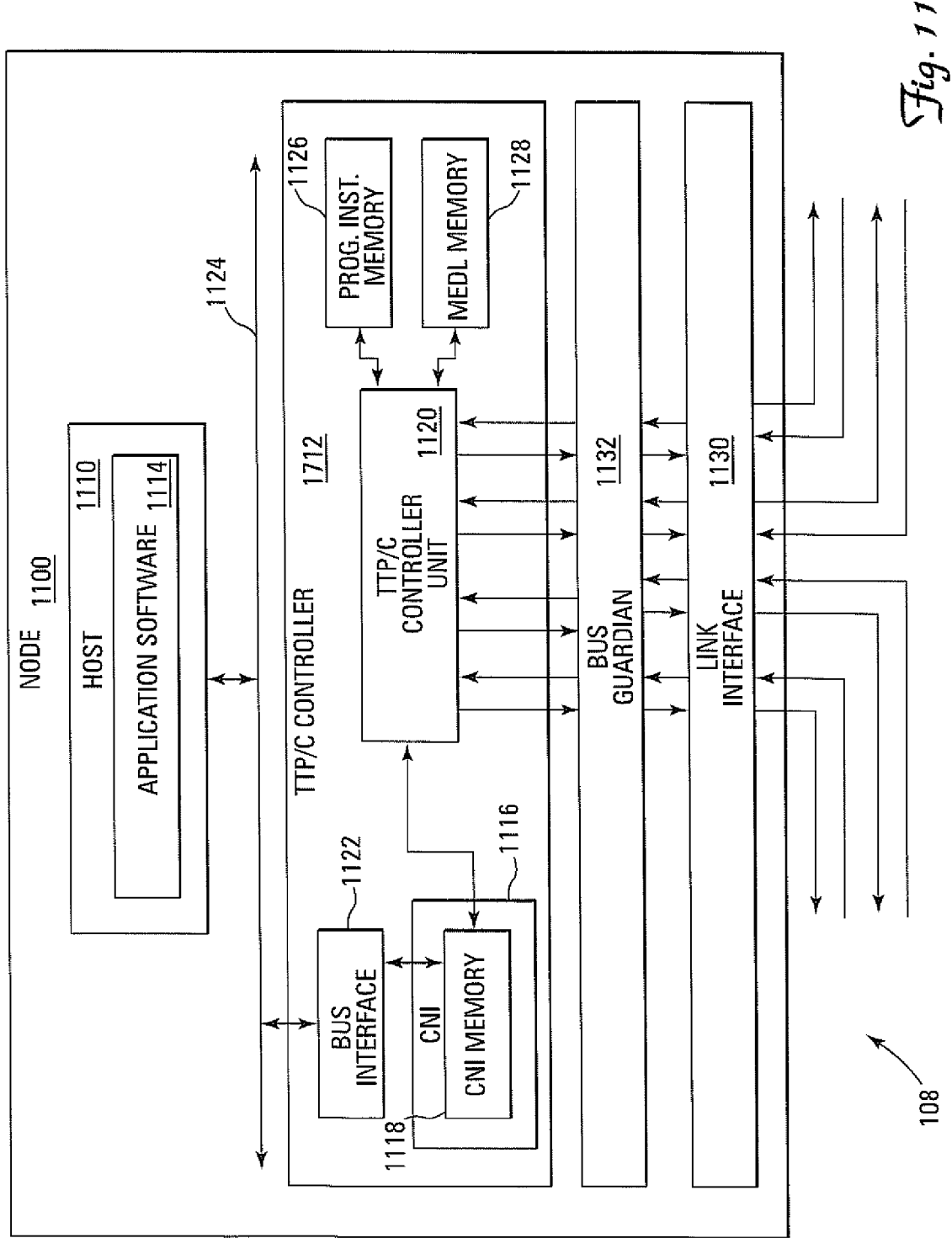
FIG. 11 is a block diagram of one exemplary embodiment of a node that is suitable for implementing each node of the network shown in FIG. 1.

The systems, devices, methods, and techniques described here can be implemented nodes that implements various types of protocols (for example, time triggered protocols such as TTP/C or FLEXRAY) FIG. 11 is a block diagram of one exemplary embodiment of a node 1100 that is suitable for implementing each node 102 of the network 100 shown in FIG. 1. The node 1100 shown in FIG. 11 implements the TTP/C protocol (though it is to be understood that the systems, devices, methods and techniques described here can be implemented using other protocols instead of or in addition to the TTP/C protocol). Each node 1100 includes a host 1110 and a TTP/C controller 1112. The host 1110 executes application software 1114 that provides the data that is communicated over the network 100. For example, in one implementation, the host 1110 is a computer executing a safety-critical control application. The host 1110 communicates with the other nodes 102 in the communication network 100 using the TTP/C controller 1112. The TTP/C controller 1112 implements the functionality of the TTP/C protocol. The TTP/C protocol provides three basic services to the application software 1114 executing on the host 1110. The TTP/C protocol provides deterministic message sending, a global time base, and membership service so that each node 1100 knows which node is currently transmitting.

The TTP/C controller 1112 includes a communication network interface (CNI) 1116 that serves as an interface between the host 1110 and the other components of the TTP/C controller 1112. In the embodiment shown in FIG. 11, the CNI 1116 is implemented using a dual-ported memory 1118 (also referred to here as the "CNI memory 1118). The CNI memory 1118 is accessed by the host 1110 and by a TTP/C controller unit 1120 included in the TTP/C controller 1112. In one implementation of such an embodiment, the CNI memory 1118 is implemented using a static random access memory (SRAM). A bus interface 1122 couples the CNI memory 1118 to buses 1124 (for example, data, address, and/or control buses) over which the host 1110 reads and writes data from and to the CNI memory 1118. In other embodiments, the CNI memory 1118 is accessed in other ways (for example, using a serial interface).

The TTP/C controller unit 1120 provides functionality necessary to implement the TTP/C protocol. In one implementation of such an embodiment, the TTP/C controller unit 1120 is implemented using a programmable processor (for example, a microprocessor) that is programmed with instructions to carry out the functionality performed by the TTP/C controller unit 1120. In such an embodiment, instruction memory 1126 is coupled to the TTP/C controller unit 1120. Program instructions that are executed by the TTP/C controller unit 1120 are stored in the program instruction memory 1126. In one implementation, the program memory 1126 is implemented using a read only memory device or a non-volatile memory device such as a flash memory device.

The TTP/C controller 1112 also includes message descriptor list (MEDL) memory 1128 in which configuration information for a time-division multiple access (TDMA) schedule, operating modes, and clock synchronization parameters are stored. The MEDL memory 1128 is typically implemented using, for example, a flash memory device and/or static random access memory (SRAM) device. Both the size of the CNI memory 1118, the program memory 1126, and the MEDL memory 1128 are selected based on the specific needs of the application software 1114 executing on the host 1110, the program instructions executing on the TTP/controller unit 1120, and/or a bus guardian 1132 (described below). Moreover, although the CNI memory 1118, the program memory 1126, and the MEDL memory 1128 are shown in FIG. 11 as separate components, in some embodiments the CNI memory 1118, the program memory 1126, and/or the MEDL memory 1128 are combined into one or more memory devices.

A single bus guardian 1132 servers as an interface between the TTP/C controller 1112 and the links 1108. In one implementation of the embodiment shown in FIG. 11, the bus guardian 1132 includes, for example, one or more universal asynchronous receiver/transmitter (UART) devices that are used to receive data from and transmit and relay data over the serial, unidirectional point-to-point, unidirectional links 108 shown in FIG. 1.

Data received by the bus guardian 1132 from the links 108 is passed to the TTP/C controller 1112 for processing thereby in accordance with the TTP/C protocol. Data that is to be transmitted by the TTP/C controller 1112 is passed by the TTP/C controller unit 1120 to the bus guardian 1132. The bus guardian 1132 determines when the TTP/C controller 1112 is allowed to transmit on the links 108 and when to relay data received from the links 108. In one implementation, the bus guardian 1112 implements at least a portion of the functionality described above in connection with FIGS. 2 and 3. The bus guardian 1132 accesses the MEDL information stored in the MEDL memory 1128 of the TTP/C controller 1120 in order to determine when to transmit and relay data. Thus, the bus guardian 1132 included in each node 102 serves as a bus guardian 1132 for that node 102 and for each of that node's neighbors. In this way, fault-tolerance associated with multiple bus guardians can be achieved for the nodes 102 in the network 100 while only using a single bus guardian 1132 in each node 102.

Although the TTP/C controller 1112 and the bus guardian 1132 are shown as separate components in FIG. 11, it is to be understood that in one implementation of such an embodiment, the functionality provided by the TTP/C controller 1112 and the bus guardian 1132 are integrated into a single integrated circuit device. In such an implementation, additional resource savings (for example, cost, space, and power) can be achieved. In one such implementation, a programmable processor is programmed with appropriate program instructions that, when executed by the programmable processor, carry out at least a portion of the functionality described here as being performed by the TTP/C controller 1112 and the bus guardian 1132. In other embodiments and implementations, the TTP/C controller 1112 (or one or more components thereof) and the bus guardian 1132 (or one or more components thereof) are implemented using separate components.

The systems, devices, methods, and techniques described here may be implemented in networks having network topologies other than the particular braided-ring topology illustrated in FIG. 1. For example, at least some of the systems, devices, methods, and techniques described here may be implemented in networks in which additional inter-node connections are provided between the various nodes of the network. One example of such a network is a "mesh" network. In one example of such a mesh embodiment, each node is communicatively coupled to all the other nodes in the network 100 (in the case of a "full" mesh network topology) or a subset of the other nodes in the network (in the case of a "partial" mesh network topology). For each such node, and for a given flow of data within a given channel defined in such a mesh network, at least a subset of the nodes to which that node is coupled are designated as receive-from nodes for that node and at least a subset of the nodes to which that node is coupled are designated as transmit-to nodes.

Moreover, at least some of the systems, devices, methods, and techniques described here may be implemented in networks in which fewer inter-node connections are provided between the various nodes of the network. One example of such a network is a network that comprises two "simplex" ring channels. One such embodiment is implemented in a manner to that shown in FIG. 1 except that there are no skip links that communicatively couple each node to its clockwise and counter-clockwise neighbor's neighbors). For example, an embodiment of method 300 is suitable for use in such a simplex ring network.

Furthermore, it is to be understood that the various systems, devices, methods, and techniques described here need not all be implemented together in a single network and that various combinations of such systems, devices, methods, and techniques can be implemented.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A network comprising:
   a plurality of nodes that are communicatively coupled to one another over first and second channels that form first and second rings, respectively; and
   at least one self checking pair comprising at least two of the plurality of nodes;
   wherein each node is communicatively coupled via the first channel to a first neighbor node in a first direction and to a second neighbor node in a second direction;
   wherein each node is communicatively coupled via the second channel to the first neighbor node in the first direction and to the second neighbor node in the second direction;
   wherein the two nodes of the self checking pair are neighbor nodes of one another;
   wherein, when each node relays a first relayed unit of data along the first channel in the first direction, that node relays information indicative of the integrity of the first relayed unit of data along with the first relayed unit of data;
   wherein, when each node relays a second relayed unit of data along the second channel in the second direction, that node relays information indicative of the integrity of the second relayed unit of data along with the second relayed unit of data;
   wherein, each of the two nodes of the self checking pair, for a particular unit of data communicated on the first channel in the first direction and on the second channel in the second direction:
      sends, to the other of the two nodes included in the self checking pair, information about first and second instances of the particular unit of data received by that node from the first and second channels, respectively;
      receives, from the other of the two nodes included in the self checking pair, information about first and second instances of the particular unit of data received by that other node from the first and second channels, respectively; and
      selects, for use in processing performed by that node for the self checking pair, at least one of the first and second instances of the particular unit of data received by that node based on at least one of:
         information about the first and second instances received by that node from the first and second channels, respectively; and
         information about the first and second instances received by the other of the two nodes of the self checking pair from the first and second channels, respectively.

2. The network of claim 1, wherein the two nodes of the self checking pair perform replica determinate computation.

3. The network of claim 1, wherein:
   each node is communicatively coupled via the first channel to a first neighbor's neighbor node in the first direction and to a second neighbor's neighbor node in the second direction; and
   each node is communicatively coupled via the second channel to the first neighbor's neighbor node in the first direction and to the second neighbor's neighbor node in the second direction.

4. The network of claim 3,
   wherein, when each node relays the first relayed unit of data along the first channel in the first direction, that node relays, to the first neighbor node and the first neighbor's neighbor node of that node, the first relayed unit of data and the information indicative of the integrity of the first relayed unit of data; and
   wherein, when each node relays the second relayed unit of data along the second channel in the second direction, that node relays, to the second neighbor node and the second neighbor's neighbor node, the second relayed unit of data and the information indicative of the integrity of the second relayed unit of data.

5. The network of claim 3,
   wherein the information indicative of the integrity of the first relayed unit of data comprises information indicative of a comparison, performed by the respective node, between data received on the first channel from a respective second neighbor node of that node and data received from a respective second neighbor's neighbor node of that node; and
   wherein the information indicative of the integrity of the second relayed unit of data comprises information indicative of a comparison, performed by the respective node, between data received on the second channel from a respective first neighbor node of that node and data received from a respective first neighbor's neighbor node of that node.

6. The network of claim 3, wherein the first channel comprises, for each node:
   a first direct link that communicatively couples that node to the first neighbor node of that node in the first direction;
   a first skip link that communicatively couples that node to the first neighbor's neighbor node of that node in the first direction;
   a second direct link that communicatively couples that node to the second neighbor node of that node in the second direction; and
   a second skip link that communicatively couples that node to the second neighbor's neighbor node of that node in the second direction.

7. The network of claim 3, wherein the second channel comprises, for each node:
   a first direct link that communicatively couples that node to the first neighbor node of that node in the first direction;
   a first skip link that communicatively couples that node to the first neighbor's neighbor node of that node in the first direction;
   a second direct link that communicatively couples that node to the second neighbor node of that node in the second direction; and
   a second skip link that communicatively couples that node to the second neighbor's neighbor node of that node in the second direction.

8. The network of claim 1,
wherein the first channel comprises a first direct link that communicatively couples a first of the two nodes of the self checking pair to a second of the two self checking pairs;
wherein the second channel comprises a second direct link that communicatively couples the second of the two nodes of the self checking pair to the first of the two self checking pairs; and
wherein the first of the two nodes of the self checking pair sends the information about the first and second instances received by that node from the first and second channels, respectively, to the second of the two nodes of the self checking pair over the first direct link; and
wherein the second of the two nodes of the self checking pair sends the information about the first and second instances received by that node from the first and second channels, respectively, to the first of the two nodes of the self checking pair over the second direct link.

9. The network of claim 1, wherein each unit of data comprises a frame of data.

10. The network of claim 1, the information about the first and second instances of the particular unit of data received from the first and second channels, respectively, by each of the two nodes of the self checking pair comprises a syndrome generated by the respective node based on the first and second instances of the particular unit of data received from the first and second channels, respectively, by that node.

11. The network of claim 1, wherein each of the two nodes of the self checking pair select the at least one of the first and second instances of the particular unit of data received from the first and second channels, respectively, by the respective node based on at least a source of the particular unit of data.

12. The network of claim 11, wherein, if the source of the particular unit of data is another self-checking pair, each of the two nodes of the self checking pair selects the at least one of the first and second instances of the particular unit of data by:
selecting the first instance of the particular unit of data received by that node from the first channel, if the first instance of the particular unit of data received by that node was received with integrity;
selecting the second instance of the particular unit of data received by that node, if the first instance of the particular unit of data received by that node was not received with integrity and the second instance of the particular unit of data received by that node was received with integrity.

13. The network of claim 12, wherein if the source of the particular unit of data is another self-checking pair, each of the two nodes of the self checking pair selects the at least one of the first and second instances of the particular unit of data received by that node:
by selecting at least one of the first and second instances of the particular unit of data received by that node if:
the first instance of the particular unit of data received by that node was not received with integrity, the second instance of the particular unit of data received by that node was not received with integrity, and the first instance of the particular unit of data received by that node is identical to the second instance of the particular unit of data received by that node; and
by taking a default action if the first instance of the particular unit of data received by that node was not received with integrity, the second instance of the particular unit of data received by that node was not received with integrity, and the first instance of the particular unit of data received by that node is not identical to the second instance of the particular unit of data received by that node.

14. The network of claim 12, wherein the default action comprises at least one of: selecting a last known-good value for use in the processing performed by the respective node and not performing the processing.

15. The network of claim 11, wherein if the source of the particular unit of data communicated on the first and second channels is a simplex source, each of the two nodes of the self checking pair selects the at least one of the first and second instances of the particular unit of data received by that node:
by selecting the first instance of the particular unit of data received by that node, if both the first instance of the particular unit of data received by that node and the first instance of the particular unit of data received by the other of the two nodes of the self checking pair were received with integrity; and
by selecting the second instance of the particular unit of data received by that node, if at least one of the first instance of the particular unit of data received by that node and the first instance of the particular unit of data received by the other of the two nodes of the self checking pair was received with integrity and both the second instance of the particular unit of data received by that node and the second instance of the particular unit of data received by the other of the two nodes of the self checking pair were received with integrity.

16. The network of claim 15, wherein if the source of the particular unit of data communicated on the first and second channels is a simplex source, each of the two nodes of the self checking pair select the at least one of the first and second instances of the particular unit of data received by that node:
by selecting at least one of the first and second instances of the particular unit of data received by that node if:
at least one of the first instance of the particular unit of data received by that node and the first instance of the particular unit of data received by the other of the two nodes of the self checking pair were not received with integrity;
at least one of the second instance of the particular unit of data received by that node and the second instance of the particular unit of data received by the other of the two nodes of the self checking pair were not received with integrity; and
both the first instance of the particular unit of data received by that node is identical to the second instance of the particular unit of data received by that node and the first instance of the particular unit of data received by the other of the two nodes of the self checking pair is identical to the second instance of the particular unit of data received by the other of the two nodes of the self checking pair.

17. The network of claim 16, wherein if the source of the particular unit of data communicated on the network is a simplex source, each of the two nodes of the self checking pair select the at least one of the first and second instances of the particular unit of data received by that node:
by taking a default action if:
at least one of the first instance of the particular unit of data received by that node and the first instance of the particular unit of data received by the other of the two nodes of the self checking pair were not received with integrity;

at least one of the second instance of the particular unit of data received by that node and the second instance of the particular unit of data received by the other of the two nodes of the self checking pair were not received with integrity; and either the first instance of the particular unit of data received by that node is not identical to the second instance of the particular unit of data received by that node or the first instance of the particular unit of data received by the other of the two nodes of the self checking pair is not identical to the second instance of the particular unit of data received by the other of the two nodes of the self checking pair.

18. A network comprising:

a plurality of nodes that are communicatively coupled to one another over first and second channels; and at least one self checking pair comprising at least two of the plurality of nodes;

wherein each node is communicatively coupled via the first channel to:
   at least one first transmit-to node to which that node transmits data on the first channel; and
   at least one first receive-from node from which that node receives data from the first channel;

wherein each node is communicatively coupled via the second channel to:
   at least one second transmit-to node to which that node transmits data on the second channel; and
   at least one second receive-from node from which that node receives data from the second channel;

wherein a first of the two nodes of the self checking pair comprises the respective first receive-from node and the respective second transmit-to node for a second of the two nodes of the self checking pair;

wherein the second of the two nodes of the self checking pair comprises the respective second receive-from node and the respective first transmit-to node for the first of the two nodes of the self checking pair; and wherein, when each node relays a first relayed unit of data along the first channel, that node relays information indicative of the integrity of the first relayed unit of data along with the first relayed unit of data;

wherein, when each node relays a second relayed unit of data along the second channel, that node relays information indicative of the integrity of the second relayed unit of data along with the second relayed unit of data;

wherein, each of the two nodes of the self checking pair, for a particular unit of data communicated on the first channel and on the second channel:
   sends, to the other of the two nodes included in the self checking pair, information about first and second instances of the particular unit of data received by that node from the first and second channels, respectively;
   receives, from the other of the two nodes included in the self checking pair, information about first and second instances of the particular unit of data received by that other node from the first and second channels, respectively; and
   selects, for use in processing performed by that node for the self checking pair, at least one of the first and second instances of the particular unit of data received by that node based on at least one of:
      information about the first and second instances received by that node from the first and second channels, respectively; and
      information about the first and second instances received by the other of the two nodes of the self checking pair from the first and second channels, respectively.

19. The network of claim 18, wherein the first channel forms at least one of a ring and a mesh.

20. The network of claim 18, wherein the second channel forms at least one of a ring and a mesh.

21. A method for use in a network comprising a plurality of nodes that are communicatively coupled to one another over first and second channels that form first and second rings, respectively, wherein each node is communicatively coupled via the first channel to a first neighbor node in a first direction and to a second neighbor node in a second direction and wherein each node is communicatively coupled via the second channel to the first neighbor node in the first direction and to the second neighbor node in the second direction, wherein the network comprises at least one self-checking pair that includes two nodes that are neighbor nodes of one another, the method comprising:

relaying, by each of the plurality of nodes, along the first channel, a first unit of data received by the respective node on the first channel along with information indicative of the integrity of the first relayed unit of data;

relaying, by each of the plurality of nodes, along the second channel, a second unit of data received by the respective node on the second channel along with information indicative of the integrity of the second relayed unit of data;

wherein for a particular unit of data communicated on the first and second channels, at each of the two nodes of the self checking pair:
   sending, to the other of the two nodes included in the self checking pair, information about first and second instances of the particular unit of data received by that node from the first and second channels, respectively;
   receiving, from the other of the two nodes included in the self checking pair, information about first and second instances of the particular unit of data received by that other node from the first and second channels, respectively; and
   selecting, for use in processing performed by that node for the self checking pair, at least one of the first and second instances of the particular unit of data received by that node based on at least one of:
      information about the first and second instances received by that node from the first and second channels, respectively; and
      information about the first and second instances received by the other of the two nodes of the self checking pair from the first and second channels, respectively.

22. The method of claim 21, wherein the two nodes of the self checking pair perform replica determinate computation.

23. The method of claim 21, wherein:

each node is communicatively coupled via the first channel to a first neighbor's neighbor node in the first direction and to a second neighbor's neighbor node in the second direction; and each node is communicatively coupled via the second channel to the first neighbor's neighbor node in the first direction and to the second neighbor's neighbor node in the second direction.

24. The method of claim 23,
wherein, when each node relays the first relayed unit of data along the first channel in the first direction, that node relays, to the first neighbor node and the first neighbor's neighbor node of that node, the first relayed unit of data and the information indicative of the integrity of the first relayed unit of data; and
wherein, when each node relays the second relayed unit of data along the second channel in the second direction, that node relays, to the second neighbor node and the second neighbor's neighbor node, the second relayed unit of data and the information indicative of the integrity of the second relayed unit of data.

25. The method of claim 23, further comprising:
comparing, by the respective node, between data received on the first channel from a respective second neighbor node of that node and data received from a respective second neighbor's neighbor node of that node, wherein the information indicative of the integrity of the first relayed unit of data comprises information indicative of the comparison between the data received on the first channel from the respective second neighbor node of that node and the data received from the respective second neighbor's neighbor node of that node; and
comparing, by the respective node, between data received on the second channel from a respective first neighbor node of that node and data received from a respective first neighbor's neighbor node of that node, wherein the information indicative of the integrity of the second relayed unit of data comprises information indicative of the comparison between the data received on the second channel from the respective first neighbor node of that node and the data received from the respective first neighbor's neighbor node of that node.

26. The method of claim 21,
wherein the first channel comprises a first direct link that communicatively couples a first of the two nodes of the self checking pair to a second of the two self checking pairs;
wherein the second channel comprises a second direct link that communicatively couples the second of the two nodes of the self checking pair to the first of the two self checking pairs; and
wherein the first of the two nodes of the self checking pair sends the information about the first and second instances received by that node from the first and second channels, respectively, to the second of the two nodes of the self checking pair over the first direct link; and
wherein the second of the two nodes of the self checking pair sends the information about the first and second instances received by that node from the first and second channels, respectively, to the first of the two nodes of the self checking pair over the second direct link.

27. The method of claim 21, wherein each unit of data comprises a frame of data.

28. The method of claim 21, the information about the first and second instances of the particular unit of data received from the first and second channels, respectively, by each of the two nodes of the self checking pair comprises a syndrome generated by the respective node based on the first and second instances of the particular unit of data received from the first and second channels, respectively, by that node.

29. The method of claim 21, wherein each of the two nodes of the self checking pair select the at least one of the first and second instances of the particular unit of data received from the first and second channels, respectively, by the respective node based on at least a source of the particular unit of data.

30. The method of claim 29, wherein, if the source of the particular unit of data is another self-checking pair, each of the two nodes of the self checking pair selects the at least one of the first and second instances of the particular unit of data by:
selecting the first instance of the particular unit of data received by that node from the first channel, if the first instance of the particular unit of data received by that node was received with integrity;
selecting the second instance of the particular unit of data received by that node, if the first instance of the particular unit of data received by that node was not received with integrity and the second instance of the particular unit of data received by that node was received with integrity.

31. The method of claim 30, wherein if the source of the particular unit of data is another self-checking pair, each of the two nodes of the self checking pair selects the at least one of the first and second instances of the particular unit of data received by that node by:
selecting at least one of the first and second instances of the particular unit of data received by that node if: the first instance of the particular unit of data received by that node was not received with integrity, the second instance of the particular unit of data received by that node was not received with integrity, and the first instance of the particular unit of data received by that node is identical to the second instance of the particular unit of data received by that node; and
taking a default action if the first instance of the particular unit of data received by that node was not received with integrity, the second instance of the particular unit of data received by that node was not received with integrity, and the first instance of the particular unit of data received by that node is not identical to the second instance of the particular unit of data received by that node.

32. The method of claim 30, wherein the default action comprises at least one of: selecting a last known-good value for use in the processing performed by the respective node and not performing the processing.

33. The method of claim 29, wherein if the source of the particular unit of data communicated on the first and second channels is a simplex source, each of the two nodes of the self checking pair selects the at least one of the first and second instances of the particular unit of data received by that node by:
selecting the first instance of the particular unit of data received by that node, if both the first instance of the particular unit of data received by that node and the first instance of the particular unit of data received by the other of the two nodes of the self checking pair were received with integrity; and
selecting the second instance of the particular unit of data received by that node, if at least one of the first instance of the particular unit of data received by that node and the first instance of the particular unit of data received by the other of the two nodes of the self checking pair was received with integrity and both the second instance of the particular unit of data received by that node and the second instance of the particular unit of data received by the other of the two nodes of the self checking pair were received with integrity.

34. The method of claim 33, wherein if the source of the particular unit of data communicated on the first and second channels is a simplex source, each of the two nodes of the self checking pair select the at least one of the first and second instances of the particular unit of data received by that node by:

selecting at least one of the first and second instances of the particular unit of data received by that node if:
- at least one of the first instance of the particular unit of data received by that node and the first instance of the particular unit of data received by the other of the two nodes of the self checking pair were not received with integrity;
- at least one of the second instance of the particular unit of data received by that node and the second instance of the particular unit of data received by the other of the two nodes of the self checking pair were not received with integrity; and
- both the first instance of the particular unit of data received by that node is identical to the second instance of the particular unit of data received by that node and the first instance of the particular unit of data received by the other of the two nodes of the self checking pair is identical to the second instance of the particular unit of data received by the other of the two nodes of the self checking pair.

35. The method of claim 34, wherein if the source of the particular unit of data communicated on the network is a simplex source, each of the two nodes of the self checking pair select the at least one of the first and second instances of the particular unit of data received by that node:

by taking a default action if:
- at least one of the first instance of the particular unit of data received by that node and the first instance of the particular unit of data received by the other of the two nodes of the self checking pair were not received with integrity;
- at least one of the second instance of the particular unit of data received by that node and the second instance of the particular unit of data received by the other of the two nodes of the self checking pair were not received with integrity; and
- either the first instance of the particular unit of data received by that node is not identical to the second instance of the particular unit of data received by that node or the first instance of the particular unit of data received by the other of the two nodes of the self checking pair is not identical to the second instance of the particular unit of data received by the other of the two nodes of the self checking pair.

36. A self checking pair comprising:

first and second nodes, wherein each of the first and second nodes comprises an interface to communicatively couple the respective node to at least first and second channels, wherein the first and the second channels comprise first and second rings respectively;

wherein the first and second nodes are neighbor nodes of one another;

wherein, for each unit of data relayed on the first and second channels, information indicative of the integrity of the relayed unit of data is relayed along with the relayed unit of data; and wherein for a particular unit of data communicated on the network:
- each of the first and second nodes exchange information about a first instance of the particular unit of data received from the first channel and about a second instance of the particular unit of data received from the second channel; and
- each of the first and second nodes of the self checking pair selects, for use in processing performed by the respective node, at least one of the first and second instances of the particular unit of data received by the respective node based on at least one of: information about the first and second instances received by that node from the first and second channels, respectively; and
  - information about the first and second instances received by the other of the two nodes of the self checking pair from the first and second channels, respectively.

37. Apparatus comprising:

a self checking pair comprising first and second nodes, wherein each of the first and second nodes comprises means for communicatively coupling the respective node to at least first and second channels, wherein the first and the second channels comprise first and second rings respectively;

wherein the first and second nodes are neighbor nodes of one another;

wherein, for each unit of data relayed on the first and second channels, information indicative of the integrity of the relayed unit of data is relayed along with the relayed unit of data; and wherein each of the first and second nodes further comprises means for processing a particular unit of data communicated on the first and second channels, that comprises means for sending, to the other of the two nodes included in the self checking pair, information about first and second instances of the particular unit of data received by that node from the first and second channels, respectively;

means for receiving, from the other of the two nodes included in the self checking pair, information about first and second instances of the particular unit of data received by that other node from the first and second channels, respectively; and means for selecting, for use in processing performed by that node for the self checking pair, at least one of the first and second instances of the particular unit of data received by that node based on at least one of:
- information about the first and second instances received by that node from the first and second channels, respectively; and
- information about the first and second instances received by the other of the two nodes of the self checking pair from the first and second channels, respectively.

* * * * *